(12) United States Patent
Baillie et al.

(10) Patent No.: US 12,552,885 B2
(45) Date of Patent: Feb. 17, 2026

(54) POLYMERIZATION PROCESS THAT INCLUDE GROUP III AND LANTHANIDE BIS-PHENYL-PHENOXY METAL-LIGAND COMPLEXES AND CHAIN TRANSFER AGENTS

(71) Applicant: Dow Global Technologies LLC, Midland, MI (US)

(72) Inventors: Rhett A. Baillie, Pearland, TX (US); Philip P. Fontaine, Pearland, TX (US); Johnathan E. DeLorbe, Manvel, TX (US); Rafael Huacuja, Rosharon, TX (US); Evelyn Auyeung, Houston, TX (US); Jerzy Klosin, Midland, MI (US); Robert David Grigg, Midland, MI (US); Sudipta Pal, Midland, MI (US); Brad C. Bailey, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 665 days.

(21) Appl. No.: 17/796,531

(22) PCT Filed: Jan. 29, 2021

(86) PCT No.: PCT/US2021/015733
§ 371 (c)(1),
(2) Date: Jul. 29, 2022

(87) PCT Pub. No.: WO2021/155168
PCT Pub. Date: Aug. 5, 2021

(65) Prior Publication Data
US 2023/0348641 A1    Nov. 2, 2023

Related U.S. Application Data

(60) Provisional application No. 62/968,676, filed on Jan. 31, 2020.

(51) Int. Cl.
C08F 210/16 (2006.01)
C08F 4/52 (2006.01)
C08F 4/54 (2006.01)

(52) U.S. Cl.
CPC ............ C08F 210/16 (2013.01); C08F 4/545 (2013.01); C08F 4/52 (2013.01)

(58) Field of Classification Search
CPC .................. C08F 4/545; C08F 4/52
See application file for complete search history.

(56) References Cited

U.S. PATENT DOCUMENTS

| 8,623,976 B2 | 1/2014 | Hou et al. |
| 9,029,487 B2 * | 5/2015 | Klosin ............... C08F 210/16 526/172 |
| 9,522,855 B2 | 12/2016 | Klosin et al. |
| 2004/0010103 A1 | 1/2004 | Boussie et al. |
| 2005/0080281 A1 | 4/2005 | Boussie et al. |
| 2006/0025548 A1 | 2/2006 | Boussie et al. |
| 2007/0167315 A1 | 7/2007 | Arriola et al. |
| 2013/0144018 A1* | 6/2013 | Klosin ............... C07F 7/00 548/440 |
| 2014/0088276 A1 | 3/2014 | Hou et al. |
| 2018/0171041 A1 | 6/2018 | Patton et al. |
| 2021/0147592 A1 | 5/2021 | Keaton et al. |
| 2023/0133760 A1* | 5/2023 | Baillie ............... C07F 5/003 534/15 |

FOREIGN PATENT DOCUMENTS

| CN | 103180347 A | 6/2013 |
| CN | 105294905 A | 2/2016 |
| CN | 109476783 A | 3/2019 |
| EP | 2609123 B1 | 8/2011 |
| WO | 2007136494 A2 | 11/2007 |
| WO | 2007136495 A2 | 11/2007 |
| WO | 2007136496 A2 | 11/2007 |

(Continued)

OTHER PUBLICATIONS

Brazilian Technical Report dated Jul. 4, 2024, pertaining to BR Patent Application No. BR 11 2022 014843.7, 8 pgs.

(Continued)

*Primary Examiner* — Rip A Lee
(74) *Attorney, Agent, or Firm* — Dinsmore & Shohl LLP

(57) ABSTRACT

Embodiments of this disclosure are directed to polymerization process comprising contacting ethylene and optionally one or more α-olefins in solution in the presence of one or more catalyst systems and a chain transfer agent, wherein the catalyst system comprises a metal-ligand complex according to formula (I).

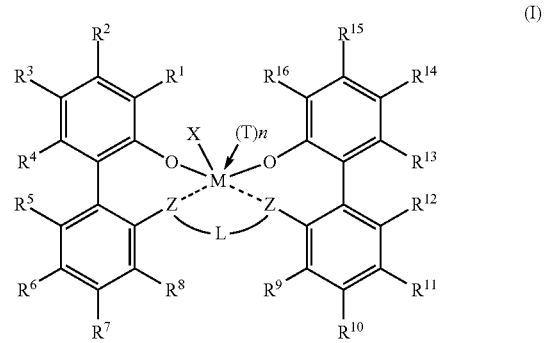

19 Claims, No Drawings

(56) References Cited

FOREIGN PATENT DOCUMENTS

| | | | |
|---|---|---|---|
| WO | 2007136497 A2 | 11/2007 | |
| WO | 2007136506 A2 | 11/2007 | |
| WO | 2011146291 A1 | 11/2011 | |
| WO | 2012027448 A1 | 3/2012 | |
| WO | 2014105411 A1 | 7/2014 | |
| WO | 2014105412 A1 | 7/2014 | |
| WO | 2014105413 A1 | 7/2014 | |
| WO | 2014105414 A1 | 7/2014 | |
| WO | 2014105415 A1 | 7/2014 | |
| WO | 2014210333 A1 | 12/2014 | |
| WO | 2016003878 A1 | 1/2016 | |
| WO | 2016014749 A1 | 1/2016 | |
| WO | 2016089935 A1 | 6/2016 | |
| WO | 2017004456 A1 | 1/2017 | |
| WO | 2017004462 A1 | 1/2017 | |
| WO | 2017058858 A1 | 4/2017 | |
| WO | 2017058981 A1 | 4/2017 | |
| WO | 2018022975 A1 | 2/2018 | |
| WO | 2018170138 A1 | 9/2018 | |
| WO | 2018170227 A1 | 9/2018 | |
| WO | 2018170248 A1 | 9/2018 | |
| WO | 2018183056 A1 | 10/2018 | |
| WO | 2020047384 A1 | 3/2020 | |

OTHER PUBLICATIONS

Thailand Office Action dated Sep. 4, 2024, pertaining to TH Patent Application No. 2201004698, 7 pgs.
Chinese Office Action and Search Report, dated Aug. 15, 2023, pertaining to Chinese Patent Application No. 202180017151.6, 10 pgs.
Tie-Qi Xu, et al., "Metal-size influence in isoselective 2-vinylpyrindine polymerization," Polyhedron, vol. 165, Mar. 21, 2019.
Japanese Office Action dated Dec. 17, 2024, pertaining to JP Patent Application No. 2022-544636, 7 pgs.
Emslie et al. "Synthesis and thermal reactivity of organoscandium and yttrium complexes of sterically less bulky salicylaldiminato ligands", Dalton Trans., 2003, 2615-2620.
Hashimoto et al. "Kinetic Stabilizaiton of Carbazole Nitroxides by Inclusion in a Macrocage and Their Electron Spin Resonance Characterization", J. Org. Chem. 2019, 84, 11783-11789.
Jian et al. "Rare-earth metal bis(alkyl)s that bear a 2-pyridinemethanamine ligand: Dual catalysis of the polymerizations of both isoprene and ethylene", Dalton Trans., 2012, 41, 2367.
Pan et al. "Chain-Shuttling Polymerization at Two Different Scandium Sites: Regio- and Stereospecific "One-Pot" Block Copolymerization of Styrene, Isoprene, and Butadiene", Angew. Chem. Int. Ed. 2011, 50, 12012-12015.
Odian "Principles of Polymerization" Wiley-Interscience, A John Wiley & Sons, Inc., Publication, Fourth Edition, 2004, 835 pgs.
Soave, "Equilibrium constants from a modified Redlich-Kwong equation of state", Chemical Engineering Science, 1972, vol. 27, pp. 1197-1203, 7 pgs.
Xu et al., "Metal-size influence in isoselective 2-vinylpyridine polymerization", Polyhedron 165 (2019) 68-72, 5 pgs.
Valente, et al., "Isoprene-styrene chain shuttling copolymerization mediated by lanthanide half-sandwich complex and lanthanidocene: a straightforward access to a new type of thermoplastic elastomers", Angew. Chem., Int. Ed., vol. 53, pp. 4638-4641 (2014).
Liu et al., "Stereoselective Polymerization of Styrene with Cationic Scandium Precursors Bearing Quinolyl Aniline Ligands", Organometallics, vol. 29, pp. 1916-1923 (2010).
Döring et al., "Aminopyridinato-Ligand-Stabilized Lanthanoid Complexes: Synthesis, Reactivity, Ethylene and Isoprene Polymerization", Eur. J. Inorg. Chem., pp. 4255-4264 (2009).
International Search Report and Written Opinion dated May 10, 2021, pertaining to International Patent Application No. PCT/US2021/015723, 15 pgs.
International Search Report and Written Opinion dated May 10, 2021, pertaining to International Patent Application No. PCT/US2021/015733, 15 pgs.
Japanese Office Action dated Apr. 2, 2024, pertaining to JP Patent Application No. 2023-061074, 10 pgs.
Japanese Office Action dated Aug. 20, 2024, pertaining to JP Patent Application No. 2022-544639, 6 pgs.
Xu et al. "Highly Robust Yttrium Bis(phenolate) Ether Catalysts for Excellent Isoselective Ring-Opening Polymerization of Racemic Lactide," Macromolecules (2017), vol. 50, pp. 515-522.
Brazil Technical Report dated Aug. 7, 2024, pertaining to BR Patent Application No. BR112022015190.0, 8 pgs.
Singapore Office Action dated Jul. 17, 2025, pertaining to SG Patent Application No. 11202251280J, 5 pgs.
US Non-Final Office Action dated May 6, 2025, pertaining to U.S. Appl. No. 17/796,560, 8 pgs.
US Non-Final Office Action dated May 30, 2025, pertaining to U.S. Appl. No. 17/930,274, 8 pgs.
US Notice of Allowance dated Sep. 8, 2025, pertaining to U.S. Appl. No. 17/796,560, 6 pgs.
US Final Rejection dated Oct. 2, 2025, pertaining to U.S. Appl. No. 17/930,274, 6 pgs.
US Notice of Allowance dated Nov. 25, 2025, pertaining to U.S. Appl. No. 17/930,274, 6 pgs.
Korean Office Action dated Nov. 5, 2025, pertaining to KR Patent Application No. 10-2022-7029713, 15 pgs.
Korean Office Action dated Dec. 2, 2025, pertaining to KR Patent Application No. 10-2022-7029714, 8 pgs.

\* cited by examiner

POLYMERIZATION PROCESS THAT INCLUDE GROUP III AND LANTHANIDE BIS-PHENYL-PHENOXY METAL-LIGAND COMPLEXES AND CHAIN TRANSFER AGENTS

CROSS REFERENCE TO RELATED APPLICATIONS

This application claims priority to U.S. Provisional Patent Application No. 62/968,676, filed on Jan. 31, 2020, the entire disclosure of which is hereby incorporated by reference.

TECHNICAL FIELD

Embodiments of the present disclosure generally relate to olefin polymerization catalyst systems and processes and, more specifically to bis-phenylphenoxy metal-ligand complex having a Group III or Lanthanide metal center.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin-based polymers.

Ethylene-based polymers and propylene-based polymers are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents or solvents, such as alkanes or isoalkanes, of which hexane and isobutane are specific examples. Hydrogen may also be added to the reactor. The catalyst systems for producing ethylene-based polymers may typically comprise a chromium-based catalyst system, a Ziegler-Natta catalyst system, and/or a molecular (either metallocene or non-metallocene (molecular)) catalyst system. The reactants in the catalyst system and the diluent are circulated at an elevated polymerization temperature within the reactor, thereby producing ethylene-based homopolymer or copolymer. Either periodically or continuously, part of the reaction mixture is removed from the reactor, including the polyethylene product dissolved in the diluent, and also unreacted ethylene and one or more optional co-monomers. The reaction mixture may be processed after removal from the reactor to remove the polyethylene product from the diluent and the unreacted reactants, and the diluent and unreacted reactants are typically recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

Additionally, there is a need to create catalysts that are capable of chain-shuttling technology. The catalytic production of olefin block copolymers (OBC) is enabled by chain-shuttling technology. The catalyst technology involves two catalysts, catalyst 1, the "soft block catalyst", that makes an amorphous poly(ethylene-co-monomer) copolymer, and catalyst 2, the "hard block catalyst", that makes a higher-density copolymer containing far less comonomer than the soft block. The growing polymer chain is transferred between the two catalysts with a chain shuttling agent (CSA) to make a block copolymer containing alternating hard and soft blocks. The properties of such and OBC are improved over blends made of the separate soft and hard blocks.

SUMMARY

There is an ongoing need to create catalyst systems or metal-ligand complex with a high selectivity toward ethylene. Additionally, the metal-ligand complex should have high catalyst efficiency, high reactivity (such that the efficiency is greater than 20,000 gram of polymer per gram of metal in the catalyst), and a versatile ability to produce polymers with a high or low molecular weight at high temperature (such as greater than 140° C. or approximately 190° C.).

Embodiments of this disclosure include a polymerization process. The polymerization process includes polymerizing ethylene and optionally one or more α-olefins in solution in the presence of one or more catalyst systems and a chain transfer agent, wherein the catalyst system comprises a metal-ligand complex according to formula (I):

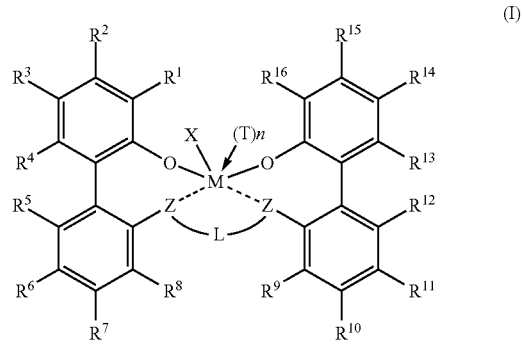

In formula (I), M is scandium, yttrium, lanthanide metal or an actinide metal having an oxidation state of +3. Subscript n of $(T)_n$ is 0, 1, or 2, and each T is a Lewis base. X is a ligand chosen from $(C_1\text{-}C_{40})$hydrocarbyl, $(C_1\text{-}C_{40})$heterohydrocarbyl, $-CH_2Si(R^C)_{3\text{-}Q}(OR^C)_Q$, $-Si(R^C)_{3\text{-}Q}(OR^C)_Q$, $-OSi(R^C)_{3\text{-}Q}(OR^C)_Q$, $-CH_2Ge(R^C)_{3\text{-}Q}(OR^C)_Q$, $-Ge(R^C)_{3\text{-}Q}(OR^C)_Q$, $-P(R^C)_{2\text{-}W}(OR^C)_W$, $-P(O)(R^C)_{2\text{-}W}(OR^C)_W$, $-N(R^C)_2$, $-NH(R^C)$, $-N(Si(R^C)_3)_2$, $NR^C Si(R^C)_3$, $-NHSi(R^C)_3$, $-OR^C$, $-SR^C$, $-NO_2$, $-CN$, $-CF_3$, $-OCF_3$, $-S(O)R^C$, $-S(O)_2R^C$, $-OS(O)_2R^C$, $-N=C(R^C)_2$, $-N=CH(R^C)$, $-N=CH_2$, $-N=P(R^C)_3$, $-OC(O)R^C$, $-C(O)OR^C$, $-N(R^C)C(O)R^C$, $-N(R^C)C(O)H$, $-NHC(O)R^C$, $-C(O)N(R^C)_2$, $-C(O)NHR^C$, $-C(O)NH_2$, a halogen, or a hydrogen, wherein each $R^C$ is independently a substituted or unsubstituted $(C_1\text{-}C_{30})$hydrocarbyl, or a substituted or unsubstituted $(C_1\text{-}C_{30})$heterohydrocarbyl. Subscript Q is 0, 1, 2 or 3 and Subscript W is 0, 1, or 2. When subscript n of $(T)_n$ is 1, X and T are optionally connected. When subscript n of $(T)_n$ is 2, X and one of the two T groups are optionally connected. The metal-ligand complex is overall charge-neutral.

In formula (I), $R^1$ and $R^{16}$ are independently selected from the group consisting of —H, $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —O$R^C$, —S$R^C$, —NO$_2$, —CN, —CF$_3$, $R^CS(O)$—, $R^CS(O)_2$—, —N=C$(R^C)_2$, $R^CC(O)O$—, $R^COC(O)$—, $R^CC(O)N(R)$—, $(R^C)_2NC(O)$—, halogen, radicals having formula (II), radicals having formula (III), and radicals having formula (IV):

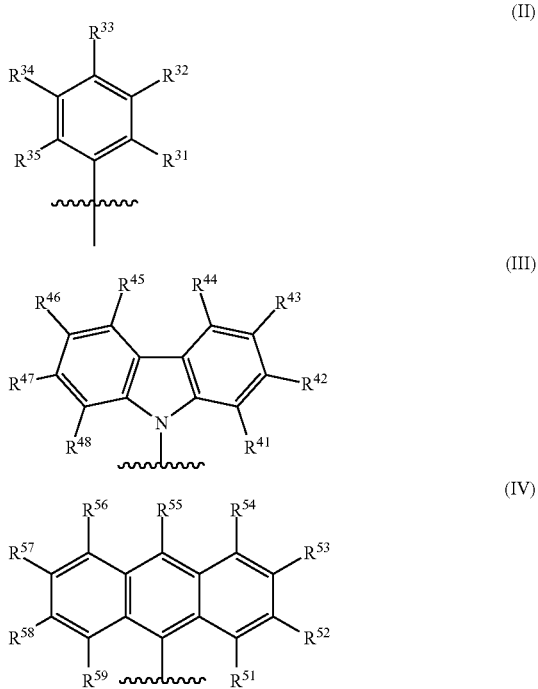

In formulas (II), (III), and (IV), each of $R^{31-35}$, $R^{41-48}$, and $R^{51-59}$ is independently chosen from —H, $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —O$R^C$, —S$R^C$, —NO$_2$, —CN, —CF$_3$, $R^CS(O)$—, $R^CS(O)_2$—, $(R^C)_2C=N$—, $R^CC(O)O$—, $R^COC(O)$—, $R^CC(O)N(R^N)$—, $(R^C)_2NC(O)$—, or halogen;

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ is independently selected from —H, $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —O$R^C$, —S$R^C$, —NO$_2$, —CN, —CF$_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, and halogen.

In formula (I), L is $(C_1-C_{40})$hydrocarbylene or $(C_1-C_{40})$heterohydrocarbylene; and each Z is independently chosen from —O—, —S—, —N$(R^N)$—, or —P$(R^P)$—, and the dotted line is optionally a dative bond.

In formulas (I), (II), (III), and (IV), each $R^C$, $R^P$, and $R^N$ is independently a $(C_1-C_{30})$hydrocarbyl, $(C_1-C_{30})$heterohydrocarbyl, or —H.

DETAILED DESCRIPTION

Specific embodiments of catalyst systems will now be described. It should be understood that the catalyst systems of this disclosure may be embodied in different forms and should not be construed as limited to the specific embodiments set forth in this disclosure.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf trifluoromethane sulfonate; CV: column volume (used in column chromatography); EtOAc ethyl acetate; TEA: triethylaluminum; MAO: methylaluminoxane; MMAO: modified methylaluminoxane; LiCH$_2$TMS: (trimethylsilyl)methyllithium; TMS: trimethylsilyl; Pd(AmPhos)Cl$_2$: Bis(di-tert-butyl(4-dimethylaminophenyl)phosphine)dichloropalladium(II); Pd(AmPhos): Chloro(crotyl)(di-tert-butyl(4-dimethylaminophenyl)phosphine)palladium(II); Pd(dppf)Cl$_2$: [1,1'-Bis(diphenylphosphino)ferrocene]palladium(II) dichloride; ScCl$_3$: scandium(III) chloride; PhMe: toluene; THF: tetrahydrofuran; CH$_2$Cl$_2$: dichloromethane; DMF: N,N-dimethylformamide; EtOAc: ethyl acetate; Et$_2$O: diethyl ether; MeOH: methanol; NH$_4$Cl: ammonium chloride; MgSO$_4$: magnesium sulfate; Na$_2$SO$_4$: sodium sulfate; NaOH: sodium hydroxide; brine: saturated aqueous sodium chloride; SiO$_2$: silica; CDCl$_3$: chloroform-D; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; TLC; thin layered chromatography; rpm: revolution per minute; rt: room temperature.

The term "independently selected" is used herein to indicate that the R groups, such as, $R^1$, $R^2$, $R^3$, $R^4$, and $R^5$, for example, may be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—C$_6$H$_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "per substitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—CH$_2$—C$_6$H$_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and [$C_{45}$]alkyl. The term "[$C_{45}$]alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{50})$cycloalkylene" means a cyclic diradical (i.e., the radicals are on ring atoms) of from 3 to 50 carbon atoms that either is unsubstituted or is substituted by one or more $R^S$.

The term "heteroatom," refers to an atom other than hydrogen or carbon. Examples of groups containing one or more than one heteroatom include O, S, S(O), S(O)$_2$, Si(R$^C$)$_2$, P(R$^P$), N(R$^N$), —N=C(R$^C$)$_2$, —Ge(R$^C$)$_2$—, or —Si(R$^C$)—, where each R$^C$ and each R$^P$ is unsubstituted $(C_1-C_{18})$hydrocarbyl or —H, and where each R$^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The ($C_1$-$C_{50}$)heterohydrocarbyl may be unsubstituted or substituted. Non-limiting examples of the ($C_1$-$C_{50}$)heterohydrocarbyl include ($C_1$-$C_{50}$)heteroalkyl, ($C_1$-$C_{50}$)hydrocarbyl-O—, ($C_1$-$C_{50}$)hydrocarbyl-S—, ($C_1$-$C_{50}$)hydrocarbyl-S(O)—, ($C_1$-$C_{50}$)hydrocarbyl-S(O)$_2$—, ($C_1$-$C_{50}$)hydrocarbyl-Si($R^C$)$_2$—, ($C_1$-$C_{50}$)hydrocarbyl-N($R^N$)—, ($C_1$-$C_{50}$)hydrocarbyl-P($R^P$)—, ($C_2$-$C_{50}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{50}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene.

The term "($C_1$-$C_{50}$)heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., ($C_x$-$C_y$)heteroaryl generally, such as ($C_4$-$C_{12}$)heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "($C_1$-$C_{50}$)heteroalkyl" means a saturated straight or branched chain radical containing one to fifty carbon atoms and one or more heteroatom. The term "($C_1$-$C_{50}$)heteroalkylene" means a saturated straight or branched chain diradical containing from 1 to 50 carbon atoms and one or more than one heteroatoms. The heteroatoms of the heteroalkyls or the heteroalkylenes may include Si($R^C$)$_3$, Ge($R^C$)$_3$, Si($R^C$)$_2$, Ge($R^C$)$_2$, P($R^P$)$_2$, P($R^P$), N($R^N$)$_2$, N($R^N$), N, O, O$R^C$, S, S$R^C$, S(O), and S(O)$_2$, wherein each of the heteroalkyl and heteroalkylene groups are unsubstituted or are substituted by one or more $R^S$.

Examples of unsubstituted ($C_2$-$C_{40}$)heterocycloalkyl include unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F⁻), chloride (Cl⁻), bromide (Br⁻), or iodide (I⁻).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

The term "lanthanide metal" includes 15 elements having an atomic number of 57 through 71 (lanthanum (La) to lutetium (Lu)) as listed in the periodic table of elements.

Embodiments of this disclosure include catalyst systems that include a metal-ligand complex according to formula (I):

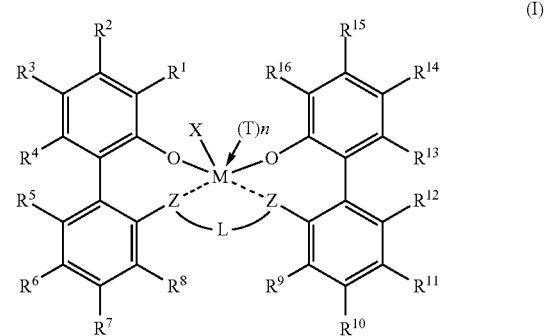

(I)

In formula (I), M is scandium, yttrium, a lanthanide metal or an actinide metal having an oxidation state of +3. Subscript n of (T)~ is 0, 1, or 2, and X is a ligand chosen from ($C_1$-$C_{40}$)hydrocarbyl, ($C_1$-$C_{40}$)heterohydrocarbyl, —CH$_2$Si($R^C$)$_{3-Q}$(O$R^C$)$_Q$, —Si($R^C$)$_{3-Q}$(O$R^C$)$_Q$, —OSi($R^C$)$_{3-Q}$(O$R^C$)$_Q$, —CH$_2$Ge($R^C$)$_{3-Q}$(O$R^C$)$_Q$, —Ge($R^C$)$_{3-Q}$(O$R^C$)$_Q$, —P($R^C$)$_{2-W}$(O$R^C$)$_W$, —P(O)($R^C$)$_{2-W}$(O$R^C$)$_W$, —N($R^C$)$_2$, —NH($R^C$), —N(Si($R^C$)$_3$)$_2$, N$R^C$Si($R^C$)$_3$—NHSi($R^C$)$_3$, O$R^C$, S$R^C$, —NO$_2$, —CN, —CF$_3$, —OCF$_3$, —S(O)$R^C$, S(O)$_2$$R^C$, —OS(O)$_2$$R^C$, —N=C($R^C$)$_2$, —N=CH($R^C$), —N=CH$_2$, —N=P($R^C$)$_3$, —OC(O)$R^C$, C(O)O$R^C$, —N($R^C$)C(O)$R^C$, —N($R^C$)C(O)H, —NHC(O)$R^C$, —C(O)N($R^C$)$_2$, —C(O)

NHR$^C$, —C(O)NH$_2$, a halogen, or a hydrogen. Each R$^C$ is independently a substituted or unsubstituted (C$_1$-C$_{30}$)hydrocarbyl, or a substituted or unsubstituted (C$_1$-C$_{30}$)heterohydrocarbyl. Subscript Q is 0, 1, 2 or 3 and subscript W is 0, 1, or 2. T is a Lewis base. When subscript n of (T)$_n$ is 1, X and T are optionally connected. When subscript n of (T)$_n$ is 2, X and one of the two T groups are optionally connected. The metal-ligand complex is overall charge-neutral.

In formula (I), R$^1$ and R$^{16}$ are independently selected from the group consisting of —H, (C$_1$-C$_{40}$)hydrocarbyl, (C$_1$-C$_{40}$) heterohydrocarbyl, —Si(R$^C$)$_3$, —Ge(R$^C$)$_3$, P(R$^P$)$_2$, —N(R$^N$)$_2$, —OR$^C$, —SR$^C$, —NO$_2$, —CN, —CF$_3$, R$^C$S(O)—, R$^C$S(O)$_2$—, —N=C(R$^C$)$_2$, R$^C$C(O)O—, R$^C$OC(O)—, R$^C$C(O)N(R)—, (R$^C$)$_2$NC(O)—, halogen, radicals having formula (II), radicals having formula (III), and radicals having formula (IV):

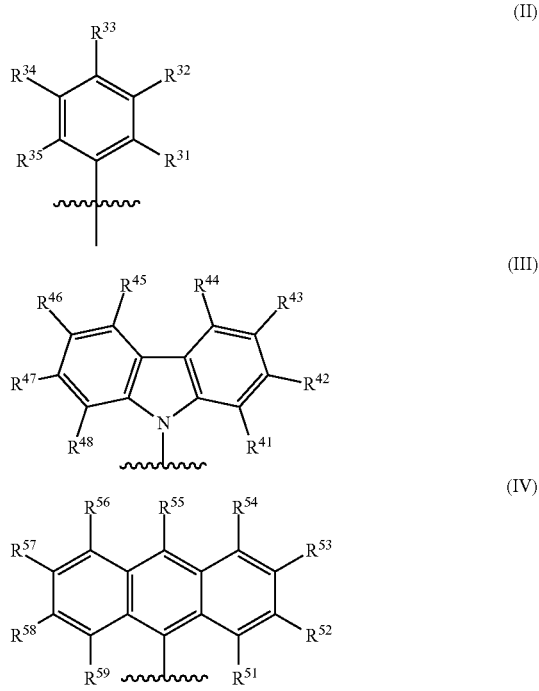

In some embodiments, in the metal-ligand complex of formula (I), either one of R$^1$ or R$^{16}$, or both R$^1$ and R$^{16}$, are chosen from radicals having formula (II), formula (III), or formula (IV).

When present in the metal-ligand complex of formula (I) as part of a radical having formula (II), formula (III), or formula (IV), the groups R$^{31\text{-}35}$, R$^{41\text{-}48}$, and R$^{51\text{-}59}$ of the metal-ligand complex of formula (I) are each independently chosen from (C$_1$-C$_{40}$)hydrocarbyl, (C$_1$-C$_{40}$)heterohydrocarbyl, Si(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^N$)$_2$NC(O)—, halogen, hydrogen (—H), or combinations thereof. Independently each R$^C$, R$^P$, and R$^N$ are unsubstituted (C$_1$-C$_{18}$)hydrocarbyl, (C$_1$-C$_{30}$) heterohydrocarbyl, or —H.

The groups R$^1$ and R$^{16}$ in the metal-ligand complex of formula (I) are chosen independently of one another. For example, R$^1$ may be chosen from a radical having formula (II), (III), or (IV) and R$^{16}$ may be a (C$_1$-C$_{40}$)hydrocarbyl; or R$^1$ may be chosen from a radical having formula (II), (III), or (IV) and R$^{16}$ may be chosen from a radical having formula (II), (III), or (IV) the same as or different from that of R$^1$. Both R$^1$ and R$^{16}$ may be radicals having formula (II), for which the groups R$^{31\text{-}35}$ are the same or different in R$^1$ and R$^{16}$. In other examples, both R$^1$ and R$^{16}$ may be radicals having formula (III), for which the groups R$^{41\text{-}48}$ are the same or different in R$^1$ and R$^{16}$; or both R$^1$ and R$^{16}$ may be radicals having formula (IV), for which the groups R$^{51\text{-}59}$ are the same or different in R$^1$ and R$^{16}$.

In some embodiments, at least one of R$^1$ and R$^{16}$ is a radical having formula (II), where R$^{32}$ and R$^{34}$ are tert-butyl. In one or more embodiments, R$^{32}$ and R$^{34}$ are (C$_1$-C$_{12}$) hydrocarbyl or —Si[(C$_1$-C$_{10}$)alkyl]$_3$.

In some embodiments, when at least one of R$^1$ or R$^{16}$ is a radical having formula (III), one of or both of R$^{43}$ and R$^{46}$ is tert-butyl and R$^{41\text{-}42}$, R$^{44\text{-}45}$, and R$^{47\text{-}48}$ are —H. In other embodiments, one of or both of R$^{42}$ and R$^{47}$ is tert-butyl and R$^{41}$, R$^{43\text{-}46}$, and R$^{48}$ are —H. In some embodiments, both R$^{42}$ and R$^{47}$ are —H. In various embodiments, R$^{42}$ and R$^{47}$ are (C$_1$-C$_{20}$)hydrocarbyl or —Si[(C$_1$-C$_{10}$)alkyl]$_3$. In other embodiments, R$^{43}$ and R$^{46}$ are (C$_1$-C$_{20}$)hydrocarbyl or —Si (C$_1$-C$_{10}$)alkyl]$_3$.

In embodiments, when at least one of R$^1$ or R$^{16}$ is a radical having formula (IV), each R$^{52}$, R$^{53}$, R$^{55}$, R$^{57}$, and R$^{58}$ are —H, (C$_1$-C$_{20}$)hydrocarbyl, —Si[(C$_1$-C$_{20}$)hydrocarbyl]$_3$, or —Ge[(C$_1$-C$_{20}$)hydrocarbyl]$_3$. In some embodiments, at least one of R$^{52}$, R$^{53}$, R$^{55}$, R$^{57}$, and R$^{58}$ is (C$_3$-C$_{10}$)alkyl, —Si [(C$_3$-C$_{10}$)alkyl]$_3$, or —Ge[(C$_3$-C$_{10}$)alkyl]$_3$. In one or more embodiments, at least two of R$^{52}$, R$^{53}$, R$^{55}$, R$^{57}$, and R$^{58}$ is a (C$_3$-C$_{10}$)alkyl, —Si[(C$_3$-C$_{10}$)alkyl]$_3$, or —Ge[(C$_3$-C$_{10}$) alkyl]$_3$. In various embodiments, at least three of R$^{52}$, R$^{53}$, R$^{55}$, R$^{57}$, and R$^{58}$ is a (C$_3$-C$_{10}$)alkyl, —Si[(C$_3$-C$_{10}$)alkyl]$_3$, or —Ge[(C$_3$-C$_{10}$)alkyl]$_3$.

In some embodiments, when at least one of R$^1$ or R$^{16}$ is a radical having formula (IV), at least two of R$^{52}$, R$^{53}$, R$^{55}$, R$^{57}$, and R$^{58}$ are (C$_1$-C$_{20}$)hydrocarbyl or —C(H)$_2$Si[(C$_1$-C$_{20}$)hydrocarbyl]$_3$.

Examples of (C$_3$-C$_{10}$)alkyl include, but are not limited to: propyl, 2-propyl (also called iso-propyl), 1,1-dimethylethyl (also called tert-butyl), cyclopentyl, cyclohexyl, 1-butyl, pentyl, 3-methylbutyl, hexyl, 4-methylpentyl, heptyl, n-octyl, tert-octyl (also called 2,4,4-trimethylpentan-2-yl), nonyl, and decyl.

In formula (I), R$^2$, R$^3$, R$^4$, R$^5$, R$^6$, R$^7$, R$^8$, R$^9$, R$^{10}$, R$^{11}$, R$^{12}$, R$^{13}$, R$^{14}$, and R$^{15}$ is independently selected from —H, (C$_1$-C$_{40}$)hydrocarbyl, (C$_1$-C$_{40}$)heterohydrocarbyl, —Si(R$^C$)$_3$, —Ge(R$^C$)$_3$, P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, and halogen.

In one or more embodiments, R$^2$, R$^4$, R$^5$, R$^{12}$, R$^{13}$, and R$^{15}$ are hydrogen; and each Z is oxygen.

In one or more embodiments, when M is yttrium or a lanthanide metal, R$^1$ is not —H, phenyl or tert-butyl; and R$^{16}$ is not —H, phenyl or tert-butyl. In some embodiments, when M is yttrium or a lanthanide metal, at least one of R$^{5\text{-}8}$ is not hydrogen or at least one of R$^{9\text{-}12}$ is not hydrogen, or at least one of R$^{5\text{-}8}$ is not hydrogen and at least one of R$^{9\text{-}12}$ is not hydrogen.

In various embodiments, R$^3$ and R$^{14}$ are (C$_1$-C$_{24}$)alkyl. In one or more embodiments, R$^3$ and R$^{14}$ are (C$_4$-C$_{24}$)alkyl. In some embodiments, R$^3$ and R$^{14}$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl. In embodiments, R$^3$ and R$^{14}$ are —OR$^C$, wherein R$^C$ is (C$_1$-

$C_{20}$)hydrocarbon, and in some embodiments, $R^C$ is methyl, ethyl, 1-propyl, 2-propyl (also called iso-propyl), or 1,1-dimethylethyl.

In one or more embodiments, one of $R^8$ and $R^9$ is not —H. In various embodiments, at least one of $R^8$ and $R^9$ is ($C_1$-$C_{24}$)alkyl. In some embodiments, both $R^8$ and $R^9$ are ($C_1$-$C_{24}$)alkyl. In some embodiments, $R^8$ and $R^9$ are methyl. In other embodiments, $R^8$ and $R^9$ are halogen.

In some embodiments, $R^3$ and $R^{14}$ are methyl; In one or more embodiments, $R^3$ and $R^{14}$ are ($C_4$-$C_{24}$)alkyl. In some embodiments, $R^8$ and $R^9$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl.

In various embodiments, in the metal-ligand complex of formula (I), $R^6$ and $R^{11}$ are halogen. In some embodiments, $R^6$ and $R^{11}$ are ($C_1$-$C_{24}$)alkyl. In various embodiments, $R^6$ and $R^{11}$ independently are chosen from methyl, ethyl, 1-propyl, 2-propyl (also called iso-propyl), 1,1-dimethylethyl (also called tert-butyl), cyclopentyl, cyclohexyl, 1-butyl, pentyl, 3-methylbutyl, hexyl, 4-methylpentyl, heptyl, n-octyl, tert-octyl (also called 2,4,4-trimethylpentan-2-yl), nonyl, and decyl. In some embodiments, $R^6$ and $R^{11}$ are tert-butyl. In embodiments, $R^6$ and $R^{11}$ are —$OR^C$, wherein $R^C$ is ($C_1$-$C_{20}$)hydrocarbyl, and in some embodiments, $R^C$ is methyl, ethyl, 1-propyl, 2-propyl (also called iso-propyl), or 1,1-dimethylethyl. In other embodiments, $R^6$ and $R^{11}$ are —$SiR^C_3$, wherein each $R^C$ is independently ($C_1$-$C_{20}$)hydrocarbyl, and in some embodiments, $R^C$ is methyl, ethyl, 1-propyl, 2-propyl (also called iso-propyl), or 1,1-dimethylethyl.

In some embodiments, any or all of the chemical groups (e.g., X and $R^{1-59}$) of the metal-ligand complex of formula (I) may be unsubstituted. In other embodiments, none, any, or all of the chemical groups X and $R^{1-59}$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X and $R^{1-59}$ may be per substituted with $R^S$. In the chemical groups that are per substituted with $R^S$, the individual $R^S$ may all be the same or may be independently chosen. In one or more embodiments, $R^S$ is chosen from ($C_1$-$C_{20}$)hydrocarbyl, ($C_1$-$C_{20}$)alkyl, ($C_1$-$C_{20}$)heterohydrocarbyl, or ($C_1$-$C_{20}$)heteroalkyl.

In formula (I), L is ($C_1$-$C_{40}$)hydrocarbylene or ($C_1$-$C_{40}$)heterohydrocarbylene; and each Z is independently chosen from —O—, —S—, —N($R^N$)—, or —P($R^P$)—. In one or more embodiments, L includes from 1 to 10 atoms.

In formulas (I), (II), (III), and (IV), each $R^C$, $R^P$, and $R^N$ is independently a ($C_1$-$C_{30}$)hydrocarbyl, ($C_1$-$C_{30}$)heterohydrocarbyl, or —H.

In some embodiments of formula (I), the L may be chosen from ($C_3$-$C_7$)alkyl 1,3-diradicals, such as —$CH_2CH_2CH_2$—, —$CH(CH_3)CH_2C^*H(CH_3)$, —$CH(CH_3)CH(CH_3)C^*H(CH_3)$, —$CH_2C(CH_3)_2CH_2$—, cyclopentan-1,3-diyl, or cyclohexan-1,3-diyl, for example. In some embodiments, the L may be chosen from ($C_4$-$C_{10}$) alkyl 1,4-diradicals, such as —$CH_2CH_2CH_2CH_2$—, —$CH_2C(CH_3)_2C(CH_3)_2CH_2$—, cyclohexane-1,2-diyldimethyl, and bicyclo[2.2.2]octane-2,3-diyldimethyl, for example. In some embodiments, L may be chosen from ($C_5$-$C_{12}$)alkyl 1,5-diradicals, such as —$CH_2CH_2CH_2CH_2CH_2$—, and 1,3-bis(methylene)cyclohexane. In some embodiments, L may be chosen from ($C_6$-$C_{14}$)alkyl 1,6-diradicals, such as —$CH_2CH_2CH_2CH_2CH_2CH_2$— or 1,2-bis(ethylene)cyclohexane, for example.

In one or more embodiments, L is ($C_2$-$C_{40}$)heterohydrocarbylene, and at least one of the from 2 to 10 atoms includes a heteroatom. In some embodiments, L is —$CH_2Ge(R^C)_2CH_2$—, where each $R^C$ is ($C_1$-$C_{30}$)hydrocarbyl. In some embodiments, L is —$CH_2Ge(CH_3)_2CH_2$—, —$CH_2Ge(ethyl)_2CH_2$—, —$CH_2Ge(2-propyl)_2CH_2$—, —$CH_2Ge(t-butyl)_2CH_2$—, —$CH_2Ge(cyclopentyl)_2CH_2$—, or —$CH_2Ge(cyclohexyl)_2CH_2$—.

In one or more embodiments, L is chosen from —$CH_2$—; —$CH_2CH_2$—; —$CH_2(CH_2)_mCH_2$—, where m is from 1 to 3; —$CH_2Si(R^C)_2CH_2$—; —$CH_2Ge(R^C)_2CH_2$—; —$CH(CH_3)CH_2CH^*(CH_3)$; and —$CH_2$(phen-1,2-di-yl)$CH_2$—; where each $R^C$ in L is ($C_1$-$C_{20}$)hydrocarbyl.

Examples of such ($C_1$-$C_{12}$)alkyl include, but are not limited to methyl, ethyl, 1-propyl, 2-propyl (also called iso-propyl), 1,1-dimethylethyl, cyclopentyl, or cyclohexyl, butyl, tert-butyl, pentyl, hexyl, heptyl, n-octyl, tert-octyl (also called 2,4,4-trimethylpent-2-yl), nonyl, decyl, undecyl, and dodecyl.

In some embodiments, in the metal-ligand complex according to formula (I), both $R^8$ and $R^9$ are methyl. In other embodiments, one of $R^8$ and $R^9$ is methyl and the other of $R^8$ and $R^9$ is —H.

In the metal-ligand complex according to formula (I), X bonds with M through a covalent bond or an ionic bond. In some embodiments, X may be a monoanionic ligand having a net formal oxidation state of −1. Each monoanionic ligand may independently be hydride, ($C_1$-$C_{40}$)hydrocarbyl carbanion, ($C_1$-$C_{40}$)heterohydrocarbyl carbanion, halide, nitrate, carbonate, phosphate, sulfate, $HC(O)O^-$, $HC(O)N(H)^-$, ($C_1$-$C_{40}$)hydrocarbylC(O)$O^-$, ($C_1$-$C_{40}$)hydrocarbylC(O)N(($C_1$-$C_{20}$)hydrocarbyl)$^-$, ($C_1$-$C_{40}$)hydrocarbylC(O)N(H)$^-$, $R^KR^LB^-$, $R^KR^LN^-$, $R^KO^-$, $R^KS^-$, $R^KR^LP^-$, or $R^MR^KR^LSi^-$, where each $R^K$, $R^L$, and $R^M$ independently is hydrogen, ($C_1$-$C_{40}$)hydrocarbyl, or ($C_1$-$C_{40}$)heterohydrocarbyl, or $R^K$ and $R^L$ are taken together to form a ($C_2$-$C_{40}$)hydrocarbylene or ($C_1$-$C_{20}$)heterohydrocarbylene and $R^M$ is as defined above.

In some embodiments, X is a halogen, unsubstituted ($C_1$-$C_{20}$)hydrocarbyl, unsubstituted ($C_1$-$C_{20}$)hydrocarbylC(O)O—, or $R^KR^LN^-$, wherein each of $R^K$ and $R^L$ independently is an unsubstituted($C_1$-$C_{20}$)hydrocarbyl. In some embodiments, each monodentate ligand X is a chlorine atom, ($C_1$-$C_{10}$)hydrocarbyl (e.g., ($C_1$-$C_6$)alkyl or benzyl), unsubstituted ($C_1$-$C_{10}$)hydrocarbylC(O)O—, or $R^KR^LN^-$, wherein each of $R^K$ and $R^L$ independently is an unsubstituted ($C_1$-$C_{10}$)hydrocarbyl.

In some embodiments, n is 1, and X and T are linked and selected from the group consisting of:

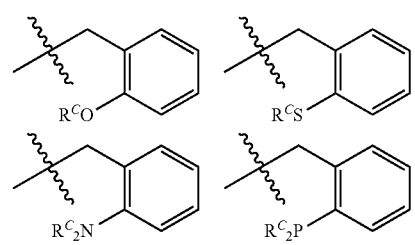

-continued

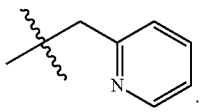

In various embodiments, n is 2, and X and one of the group T are linked and selected from the group consisting of:

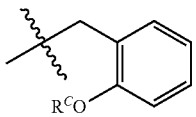 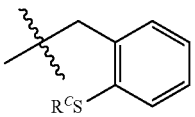

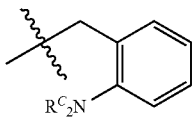 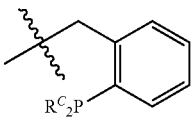

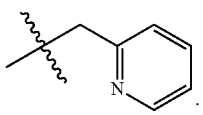

When n is 2 and X and one of the group T is connected, the other T is a Lewis Base, such as heterohydrocarbon.

In further embodiments, X is selected from methyl; ethyl; 1-propyl; 2-propyl; 1-butyl; 2,2,-dimethylpropyl; trimethylsilylmethyl; phenyl; benzyl; or chloro. X is methyl; ethyl; 1-propyl; 2-propyl; 1-butyl; 2,2,-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In one or more embodiments, each X is independently $-(CH_2)SiR^X{}_3$, in which each $R^X$ is independently a $(C_1-C_{30})$alkyl or a $(C_1-C_{30})$heteroalkyl and at least one $R^X$ is $(C_1-C_{30})$alkyl. In some embodiments, when one of $R^X$ is a $(C_1-C_{30})$heteroalkyl, the heteroatom is silica or oxygen atom. In some embodiments, $R^X$ is methyl, ethyl, propyl, 2-propyl, butyl, 1,1-dimethylethyl (or tert-butyl), pentyl, hexyl, heptyl, n-octyl, tert-octyl, or nonyl.

In one or more embodiments X is $-(CH_2)Si(CH_3)_3$, $-(CH_2)Si(CH_3)_2(CH_2CH_3)$; $-(CH_2)Si(CH_3)(CH_2CH_3)_2$, $-(CH_2)Si(CH_2CH_3)_3$, $-(CH_2)Si(CH_3)_2(n\text{-butyl})$, $-(CH_2)Si(CH_3)_2(n\text{-hexyl})$, $-(CH_2)Si(CH_3)(n\text{-Oct})R^X$, $-(CH_2)Si(n\text{-Oct})R^X{}_2$, $-(CH_2)Si(CH_3)_2(2\text{-ethylhexyl})$, $-(CH_2)Si(CH_3)_2(\text{dodecyl})$, $-CH_2Si(CH_3)_2CH_2Si(CH_3)_3$ (herein referred to as $-CH_2Si(CH_3)_2CH_2TMS$). Optionally, in some embodiments, the metal-ligand complex according to formula (I), exactly two $R^X$ are covalently linked or exactly three $R^X$ are covalently linked.

In some embodiments, X is $-CH_2Si(R^C)_{3-Q}(OR^C)_Q$, $-Si(R^C)_{3-Q}(OR^C)_Q$, $-OSi(R^C)_{3-Q}(OR^C)_Q$, in which subscript Q is 0, 1, 2 or 3 and each $R^C$ is independently a substituted or unsubstituted $(C_1-C_{30})$hydrocarbyl, or a substituted or unsubstituted $(C_1-C_{30})$heterohydrocarbyl.

In some embodiments, X is $B(R^Y)_4$, $Al(R^Y)_4$, or $Ga(R^Y)_4$, wherein each $R^Y$ is $-H$, $(C_1-C_{30})$hydrocarbyl, or halogen atom In the metal-ligand complex according to formula (I), each T bonds with M through a a dative bond or an ionic bond. In one or more embodiments, T is a Lewis base. The Lewis base may be a compound or an ionic species, which can donate an electron pair to an acceptor compound. For purposes of this description, the acceptor compound is M, the metal of the metal-ligand complex of formula (I). The Lewis base may be neutral or anionic. In some embodiments, the Lewis base may be a heterohydrocarbon or a hydrocarbon. Examples of neutral heterohydrocarbon lewis bases includes, but are not limited to, amines, trialkylamines, ethers, cycloethers, or sulfides. An example of anionic hydrocarbon includes, but is not limited to, cyclopentadiene. An example of a neutral hydrocarbon includes, but is not limited to, 1,3-buta-di-ene.

In one or more embodiments, the Lewis base may be a monodentate ligand that may a neutral ligand. In some embodiments, the neutral ligand may contain a heteroatom. In specific embodiments, the neutral ligand is a neutral group such as $R^TNR^KR^L$, $R^KOR^L$, $R^KSR^L$, or $R^TPR^KR^L$, where each $R^T$ independently is hydrogen, $[(C_1-C_{10})\text{hydrocarbyl}]_3Si(C_1-C_{10})\text{hydrocarbyl}$, $(C_1-C_{40})\text{hydrocarbyl}$, $[(C_1-C_{10})\text{hydrocarbyl}]_3Si$, or $(C_1-C_{40})\text{heterohydrocarbyl}$ and each $R^K$ and $R^L$ independently is as previously defined.

In some embodiments, the Lewis base is $(C_1-C_{20})$hydrocarbon. In some embodiments, the Lewis base is cyclopentadiene or 1,3-buta-di-ene.

In various embodiments, the Lewis base is $(C_1-C_{20})$heterohydrocarbon, wherein the hetero atom of the heterohydrocarbon is oxygen. In some embodiments, T is tetrahydrofuran, diethyl ether, or methyl tert-butyl ether (MTBE).

In the metal-ligand complex of formula (I), each Z independently is O, S, $N(C_1-C_{40})$hydrocarbyl, or $P(C_1-C_{40})$ hydrocarbyl. In some embodiments, each Z is different. For example, one Z is O and the other Z is $NCH_3$. In some embodiments, one Z is O and one Z is S. In another embodiment, one Z is S and one Z is $N(C_1-C_{40})$hydrocarbyl, (for example, $NCH_3$). In a further embodiment, each Z is the same. In yet another embodiment, each Z is O. In another embodiment, each Z is S.

In formula (I), each Z is connect to M via a dotted line. The dotted line defines an optional dative bond. In some embodiments, one of the dotted lines forms a dative bond between Z and M and the second dotted line does not directly connected or bonded Z to M. In various embodiments, each Z forms a dative bond with M. In other embodiments, each Z is not directly connect or bonded to M. Without intent to be bond by theory, it is believed that number of Z-M dative bonds depends on the atomic radius of the metal as defined by M.

In specific embodiments of catalyst systems, the metal-ligand complex according to formula (I) may include, without limitation, a complex having the structure of any of Inventive Metal-Ligand Complexes 1-16:

In specific embodiments of catalyst systems, the metal-ligand complex according to formula (I) may include, without limitation, a complex having the structure of any of Catalysts 1-4:

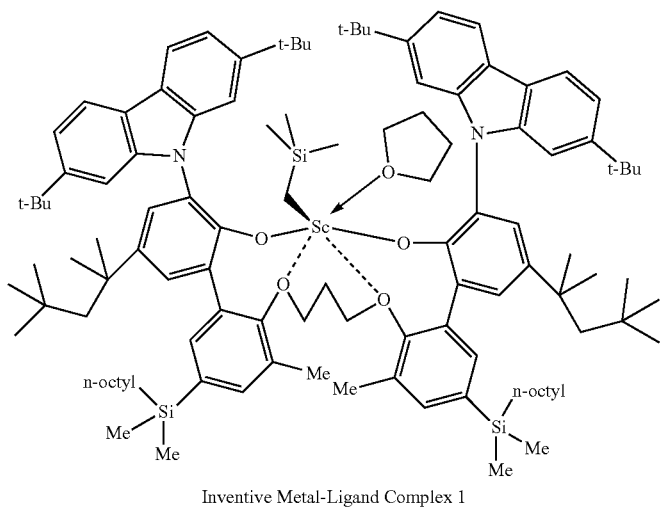
Inventive Metal-Ligand Complex 1
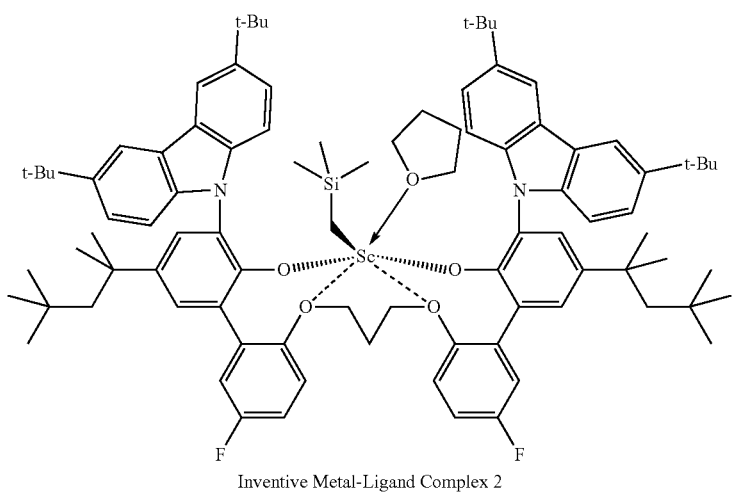
Inventive Metal-Ligand Complex 2
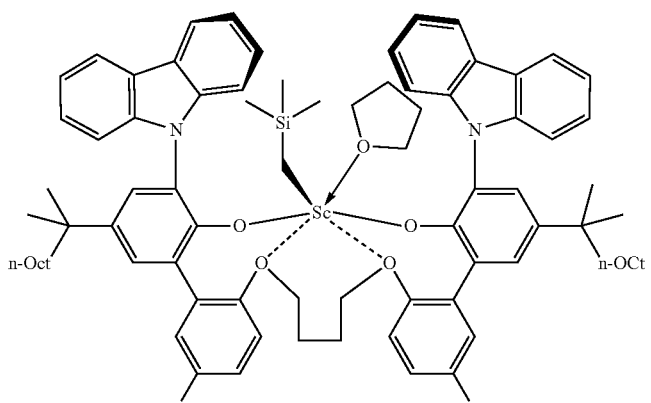
Inventive Metal-Ligand Complex 3

-continued
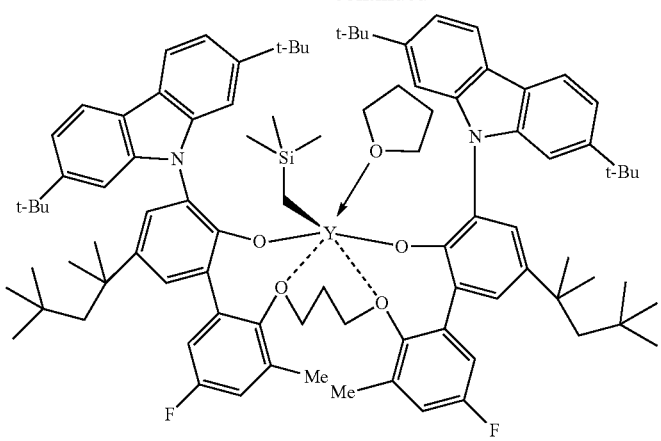
Inventive Metal-Ligand Complex 4
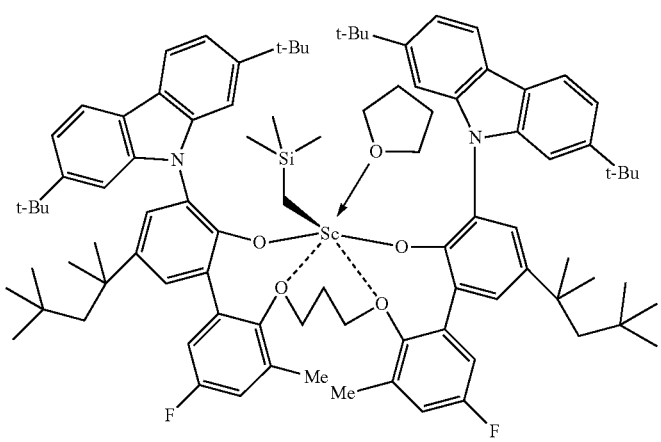
Inventive Metal-Ligand Complex 5
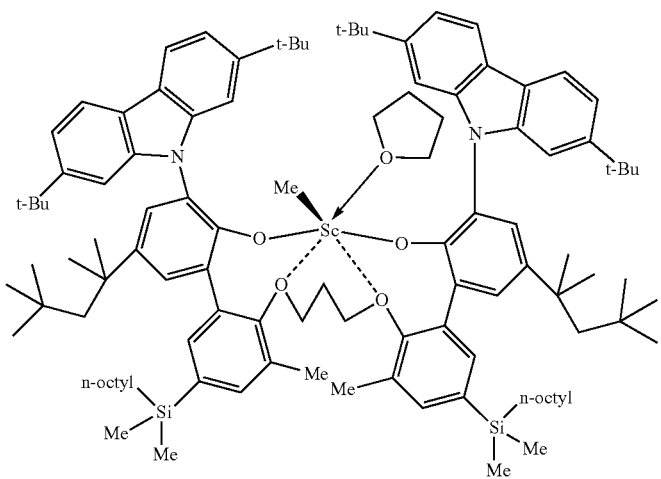
Inventive Metal-Ligand Complex 6

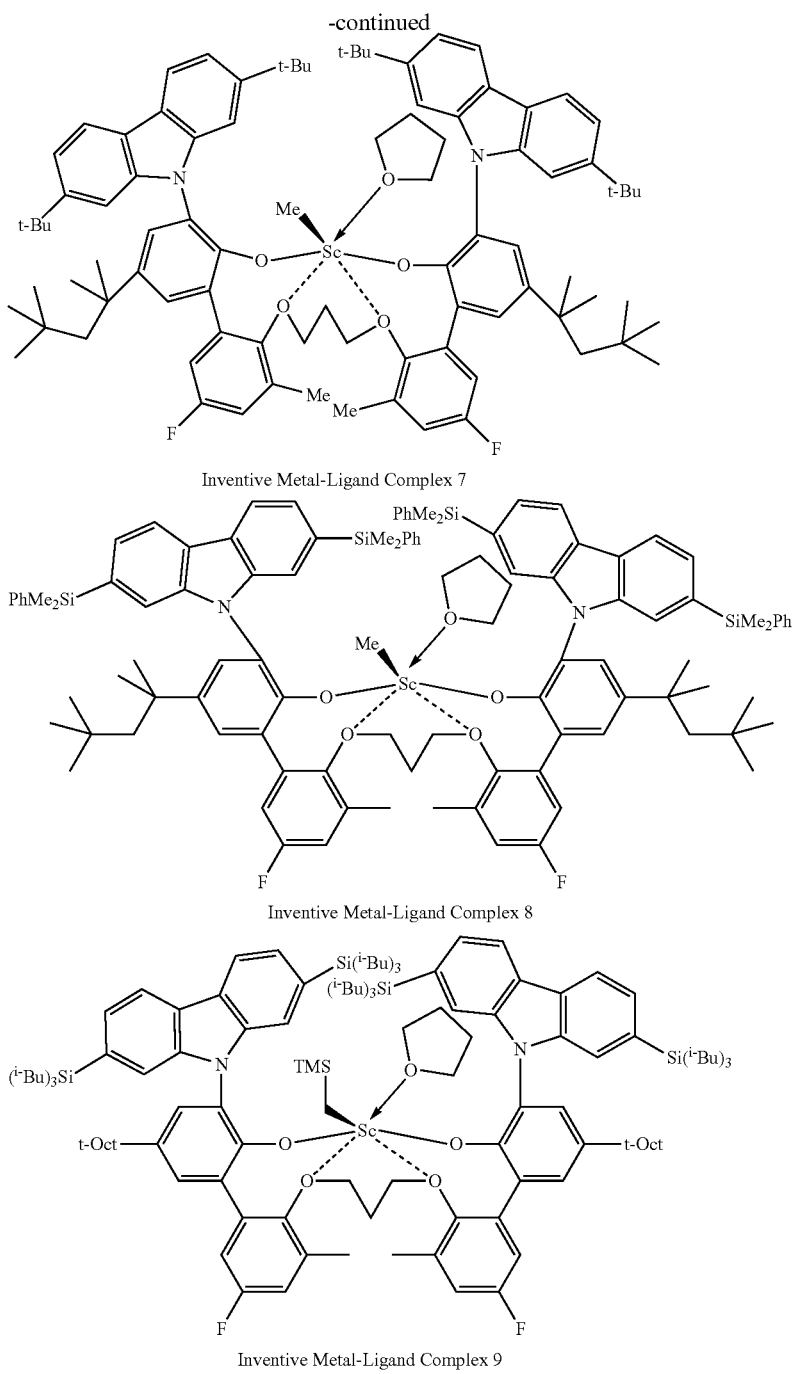

Inventive Metal-Ligand Complex 7

Inventive Metal-Ligand Complex 8

Inventive Metal-Ligand Complex 9

Chain Shuttling and/or Chain Transfer Agent

In one or more embodiments, the polymerization processes of this disclosure include contacting ethylene and/or one or more α-olefins in a reactor in the presence of a catalyst system and a chain transfer agent or chain shuttling agent. The one or more α-olefins may be ($C_3$-$C_{12}$)α-olefins, for example.

As additions to a catalyst system, chain transfer agents and chain shuttling agents are compounds capable of transferring polymer chains between two catalyst molecules in a single polymerization reactor. The catalyst molecules may have the same structure or different structures. When the catalyst molecules have different structures, they may have different monomer selectivities. Whether the compounds function as chain transfer agents or as chain shuttling agents depends on the type of polymerization reactor. For example, in a batch reactor with a single-catalyst system or a dual-catalyst system, the compounds function as chain transfer agents. In a continuous reactor with a dual-catalyst system, the compounds function as chain shuttling agents. In general, compounds that function as chain transfer agents in a batch reactor also can function as chain shuttling agents in a continuous reactor; conversely, molecules that function as chain shuttling agents also can function as chain transfer agents. Therefore, in embodiments of polymerization processes in this disclosure, it should be understood that disclosure of a compound as a "chain transfer agent" further constitutes disclosure of the same compounds as a "chain shuttling agent." Thus, the terms "chain transfer agent" and "chain shuttling agent" are interchangeable with respect to chemical compounds but are distinguishable when a process is specified to occur within a particular kind of polymerization reactor.

A catalyst's chain transfer ability is initially evaluated by running a campaign in which the level of chain transfer or shuttling agent (CSA) is varied to observe the depression in molecular weight and overall effect on the PDI expected for a shuttling catalyst. The molecular weight of the polymer generated by catalysts with potential to be good chain shuttlers will be more sensitive to the addition of CSA than the polymer molecular weight generated by catalysts exhibiting poorer shuttling or slower chain transfers kinetics. The Mayo equation (Equation 1) describes how a chain transfer agent decreases the number average chain length ($\overline{X}_n$) from the native number average chain length ($\overline{X}_{n0}$) where no chain transfer agent is present. Equation 2 defines a chain transfer or chain shuttling constant, Ca, as the ratio of chain transfer and propagation rate constants. By assuming that the vast majority of chain propagation occurs through ethylene insertion and not comonomer incorporation, Equation 3 describes the expected Mn of a polymerization. $Mn_0$ is the native molecular weight of the catalyst in the absence of chain shuttling agent and Mn is the molecular weight that is observed with chain shuttling agent ($Mn=Mn_0$ with no chain shuttling agent).

$$\frac{1}{\overline{X}_n} = \frac{1}{\overline{X}_{n_0}} + \frac{k_{tr}[\text{chain transfer agent}]}{k_p[\text{monomer}]} \quad \text{Equation 1}$$

$$Ca = \frac{k_{tr}}{k_p} \quad \text{Equation 2}$$

$$\frac{1}{Mn} = \frac{1}{Mn_0} + Ca\frac{[CSA]}{[\text{monomer}] \times 28} \quad \text{Equation 3}$$

$$[\text{Monomer}] = \quad \text{Equation 4}$$

$$(\text{Mol }\% \ C2) \times [\text{ethylene}] + (\text{Mol }\% \ C8) \times [\text{ocetene}]$$

Typically, chain transfer agents comprise a metal such as Al, B, or Ga in a formal oxidation state of +3; or a metal such as Zn or Mg in a formal oxidation state of +2. Chain transfer agents suitable for processes of this disclosure are described in U.S. Patent Application Publication Number US 2007/0167315, which is incorporated herein by reference in its entirety.

In one or more embodiments of the polymerization process, the chain transfer agent may be chosen from diethylzinc, di(iso-butyl)zinc, di(n-hexyl)zinc, di(n-octyl)zinc, trimethylaluminum, triethylaluminum, trioctylaluminum, triethylgallium, iso-butylaluminum bis(dimethyl(t-butyl)siloxane), iso-butylaluminum bis(di(trimethylsilyl)amide), n-octylaluminum di(pyridine-2-methoxide), bis(n-octadecyl) iso-butylaluminum, iso-butylaluminum bis(di(n-pentyl) amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(t-rimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), ethylzinc (t-butoxide), dimethylmagnesium, dibutylmagnesium, and n-butyl-sec-butylmagnesium.

In some embodiments, the chain transfer agent is dialkyl zinc or trialkyl aluminum. In various embodiments, the chain transfer agent is diethyl zinc, trimethylaluminum, triethyl aluminum, or trioctyl aluminum.

Olefin Propagation

While an activator and/or co-catalyst is not required to initiate olefin propagation on the metal-ligand complex of formula (I), it is believed that the metal-ligand catalyst is not efficient when the Lewis base, T, is coordinated to the metal center, M, of formula (I). Therefore, it is believed that during olefin propagation, the Lewis base disassociates from the metal center, M, and the metal-ligand complex has a structure according to formula (Ia):

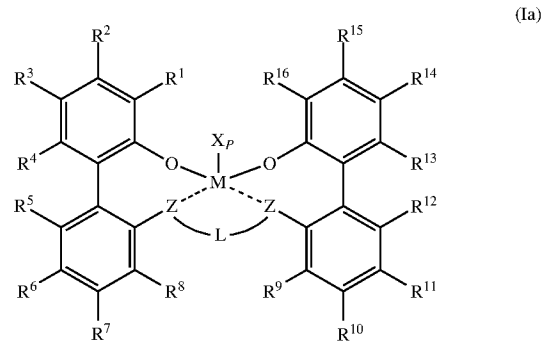

(Ia)

In formula (Ia), $R^1$ through $R^{16}$, M, Z, and L are as defined in formula (I). $X_P$ is hydrocarbyl, where the hydrocarbyl is branched or unbranched having at least 30 carbon atoms. More specifically, $X_P$ is the propagating olefin chain.

Catalyst System Properties

The procatalyst comprising the metal-ligand complex of formula (I) and one or more cocatalyst, as described herein, has a reactivity ratio $r_1$, as further defined hereinbelow, in the range of greater than 100; for example, greater than 150, or greater than 200.

For random copolymers in which the identity of the last monomer inserted dictates the rate at which subsequent monomers insert, the terminal copolymerization model is employed. In this model insertion reactions of the type $$\ldots M_iC^* + M_j \xrightarrow{k_{ij}} \ldots M_iM_jC^* \quad (A)$$

where C* represents the catalyst, $M_i$ represents monomer$_i$, and $k_{ij}$ is the rate constant having the rate equation $$R_{p_{ij}} = k_{ij}[\ldots M_iC^*][M_j] \quad (B)$$

The comonomer mole fraction (i=2) in the reaction media is defined by the equation:

$$f_2 = \frac{[M_2]}{[M_1]+[M_2]} \quad (C)$$

A simplified equation for comonomer composition can be derived as disclosed in George Odian, *Principles of Polymerization*, Second Edition, John Wiley and Sons, 1970, as follows:

$$F_2 = \frac{r_1(1-f_2)^2 + (1-f_2)f_2}{r_1(1-f_2)^2 + 2(1-f_2)f_2 + r_2 f_2^2} \quad (D)$$

From this equation the mole fraction of comonomer in the polymer is solely dependent on the mole fraction of comonomer in the reaction media and two temperature dependent reactivity ratios defined in terms of the insertion rate constants as:

$$r_1 = \frac{k_{11}}{k_{12}} \quad r_2 = \frac{k_{22}}{k} \quad (E)$$

Alternatively, in the penultimate copolymerization model, the identities of the last two monomers inserted in the growing polymer chain dictate the rate of subsequent monomer insertion. The polymerization reactions are of the form

and the individual rate equations are:

$$R_{Pijk} = k_{ijk}[\ldots M_i M_j = C^*][M_k] \quad (H)$$

The comonomer content can be calculated (again as disclosed in George Odian, Supra.) as:

$$\frac{(1-F_2)}{F_2} = \frac{1 + \frac{r'_1 X(r_1 X + 1)}{(r'_1 X + 1)}}{1 + \frac{r'_2(r_2 + X)}{X(r'_2 + X)}} \quad (I)$$

where X is defined as:

$$X = \frac{(1-f_2)}{f_2} \quad (J)$$

and the reactivity ratios are defined as:

$$r_1 = \frac{k_{111}}{k_{112}} \quad r'_1 = \frac{k_{211}}{k_{212}} \quad (K)$$
$$r_2 = \frac{k_{222}}{k_{221}} \quad r'_2 = \frac{k_{122}}{k_{121}}$$

For this model as well the polymer composition is a function only of temperature dependent reactivity ratios and comonomer mole fraction in the reactor. The same is also true when reverse comonomer or monomer insertion may occur or in the case of the interpolymerization of more than two monomers.

Reactivity ratios for use in the foregoing models may be predicted using well known theoretical techniques or empirically derived from actual polymerization data. Suitable theoretical techniques are disclosed, for example, in B. G. Kyle, *Chemical and Process Thermodynamics*, Third Addition, Prentice-Hall, 1999 and in Redlich-Kwong-Soave (RKS) Equation of State, *Chemical Engineering Science*, 1972, pp 1197-1203. Commercially available software programs may be used to assist in deriving reactivity ratios from experimentally derived data. One example of such software is Aspen Plus from Aspen Technology, Inc., Ten Canal Park, Cambridge, MA 02141-2201 USA.

Accordingly, the process for producing ethylene based polymers according to the present invention selectively gives the rich polyethylene (e.g., a high density polyethylene) or rich polyethylene segment of the poly(ethylene alpha-olefin) copolymer in the presence of alpha-olefin, which is substantially unpolymerized thereby. The process for producing ethylene-based polymers employs olefin polymerizing conditions. In some embodiments, the olefin polymerizing conditions independently produce a catalyst in situ that is formed by reaction of the procatalyst comprising metal-ligand complex of formula (I), and one or more cocatalysts in the presence of one or more other ingredients. Such other ingredients include, but are not limited to, (i) olefin monomers; (ii) another metal-ligand complex of formula (I); (iii) one or more of catalyst systems; (iv) one or more chain shuttling agents; (v) one or more catalyst stabilizers; (vi) one or more solvents; and (vii) a mixture of any two or more thereof.

A particularly inventive catalyst is one that can achieve a high selectivity for polymerizing ethylene in the presence of the ($C_3$-$C_{40}$) alpha-olefin in the process for producing an ethylene-based polymer, wherein the high selectivity is characterized by the reactivity ratio $r_1$ described previously. Preferably for the inventive process, the reactivity ratio $r_1$ is greater than 50, more preferably greater than 100, still more preferably greater than 150, still more preferably greater than 200. When the reactivity ratio $r_1$ for the invention process approaches infinity, incorporation of the alpha-olefin into (or onto) the rich polyethylene produced thereby approaches 0 mole percent (mol %).

The inventive catalyst composition comprising the procatalyst and one or more cocatalyst, as described herein, has catalytic efficiency in the rage of from greater than 1000,000 g of polymer per gram of active metal center; for example, from greater than 2000,000 g of polymer per gram of active metal center. The catalytic efficiency is measured in terms of amount of polymer produced relative to the amount catalyst used in solution polymerization process, wherein the polymerization temperature is at least 130° C., for example in the range of from 170 to 195° C., and ethylene concentration is greater than 5 g/L, for example, greater than 6 g/L, and wherein the ethylene conversion is greater than 70 percent, for example, greater than 80 percent, or in the alternative, greater than 90 percent.

Additive Component

In some embodiments, the catalyst system does not include additives. An additive is a chemical agent present during the polymerization reaction the does not deter olefin propagation. In one or more embodiments, the catalyst system further comprises an additive. In some embodiments, the additives function as a co-catalyst. In other embodiments, the additives function as a scavenger or scavenging agent. A co-catalyst is a reagent that reacts in cooperation with a catalyst to catalyze the reaction or improve the catalytic activity of the catalyst. Without intent to be bound by theory, it is believed the Lewis Base, T, of formula (I), disassociates without the presence of a co-catalyst. However, it is also believed that a co-catalyst may promote the disassociation of the Lewis base and the metal center of the metal-ligand complex.

A scavenging agent sequesters impurities in the reactor prior to addition of the precatalyst, and as such, does not constitute and activator. Lower loading of alumoxanes do not act as co-catalysts, rather they serve as scavenging agent.

Suitable additives may include, but are not limited to, alkyl aluminums; polymeric or oligomeric alumoxanes (also known as aluminoxanes); neutral Lewis acids; and non-polymeric, non-coordinating, ion-forming compounds (including the use of such compounds under oxidizing conditions). Combinations of one or more of the foregoing additives and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

In some embodiments, the additive is a Lewis acid Group 13 metal compounds containing $(C_1-C_{20})$hydrocarbyl substituents as described herein. In some embodiments, the additives include tri$((C_1-C_{20})$hydrocarbyl)-substituted-aluminum or tri$((C_1-C_{20})$hydrocarbyl)-boron compounds. In other embodiments, the additives are chosen from tri(hydrocarbyl)-substituted-aluminum, tri$((C_1-C_{20})$hydrocarbyl)-boron compounds, tri$((C_1-C_{10})$alkyl)aluminum, tri$((C_6-C_{18})$aryl)boron compounds, and halogenated (including perhalogenated) derivatives thereof.

In one or more embodiments, the polymerization process further includes a borate-based additive. In some embodiments, the borate-based additive is selected from tris(fluoro-substituted phenyl)boranes, tris(pentafluorophenyl)borane. In some embodiments, the co-catalyst is a tri$((C_1-C_{20})$ hydrocarbyl)ammonium tetra$((C_1-C_{20})$hydrocarbyl)borate (e.g. bis(octadecyl)methylammonium tetrakis(pentafluorophenyl)borate). As used herein, the term "ammonium" means a nitrogen cation that is a $((C_1-C_{20})$hydrocarbyl$)_4N^+$ a $((C_1-C_{20})$hydrocarbyl$)_3N(H)^+$, a $((C_1-C_{20})$hydrocarbyl$)_2N(H)_2^+$, $(C_1-C_{20})$hydrocarbylN(H)$_3^+$, or N(H)$_4^+$, wherein each $(C_1-C_{20})$hydrocarbyl, when two or more are present, may be the same or different.

In one or more embodiments, the additive may be chosen from polymeric or oligomeric aluminoxanes, especially methyl aluminoxane, as well as inert, compatible, noncoordinating, ion forming compounds. Exemplary suitable additives include, but are not limited to modified methyl aluminoxane (MMAO), bis(hydrogenated tallow alkyl)methyl, tetrakis(pentafluorophenyl)borate(1-)ammonium, triethyl aluminum, butylatedhydroxy-toluene diethyl aluminum, bis-(butylatedhydroxy-toluene)ethyl aluminum, tris-(butylatedhydroxy-toluene) aluminum and combinations thereof.

In some embodiments, one or more co-catalysts may be used in combination with each other. A specific example of a co-catalyst combination is a mixture of a tri$((C_1-C_8)$ hydrocarbyl)aluminum, tri$((C_1-C_4)$hydrocarbyl)borane, tri$((C_6-C_{18})$aryl)borane or an ammonium borate with an oligomeric or polymeric alumoxane compound. The ratio of total number of moles of one or more metal-ligand complexes of formula (I) to total number of moles of one or more of the co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the co-catalyst, preferably the ratio Al of the alumoxane and metal of the metal ligand complex of formula (I) (Al/M) is at least 20. When tris(pentafluorophenyl) borane alone is used as the co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1.

Polyolefins

The catalytic systems described in this disclosure may be utilized in the polymerization of olefins, primarily ethylene, propylene, α-olefins, such as octene, and dienes. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene.

In some embodiments, the catalyst systems may produce ethylene-based polymers that include at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments, the catalyst system produces ethylene-based polymers having an amount of additional α-olefin that is less than 50 mole percent (mol %); other embodiments the amount of additional α-olefin includes at least 0.01 mol % to 25 mol %; and in further embodiments the amount of additional α-olefin includes at least 0.1 mol % to 10 mol %. In some embodiments, the additional α-olefin is 1-octene.

The ethylene-based polymers may be produced by otherwise conventional polymerization processes that incorporate the catalyst systems according to embodiments of this disclosure. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and, optionally, one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst systems, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm³ to 0.970 g/cm³, from 0.870 g/cm³ to 0.950 g/cm³, from 0.870 g/cm³ to 0.920 g/cm³, or from 0.870 g/cm³ to 0.900 g/cm³, for example.

In embodiments, the polymer resulting from the catalyst system that includes the metal-ligand complex of formula (I) has a melt flow ratio ($I_{10}/I_2$) from 5 to 15, in which melt index 12 is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a melt index (I2) from 0.1 to 100, in which melt index 12 is measured according to ASTM D1238 (incorporated herein by reference in its entirety) at 190° C. and 2.16 kg load.

In some embodiments, the polymer resulting from the catalyst system that includes the metal-ligand complex of formula (I) has a molecular-weight distribution (MWD) from 1.0 to 25, where MWD is defined as $M_w/M_n$ with $M_w$ being a weight-average molecular weight and Mn being a number-average molecular weight. In other embodiments, the polymers resulting from the catalyst system have a MWD from 1.5 to 6. Another embodiment includes a MWD from 1.5 to 3; and other embodiments include MWD from 2 to 2.5.

SymRAD HT-GPC Analysis

The molecular weight data is determined by analysis on a hybrid Robot-Assisted Dilution High-Temperature Gel Permeation Chromatographer (Sym-RAD-GPC) built by Symyx/Dow. The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

EXAMPLES

Examples 1 to 4 are synthetic procedures for the ligands and the isolated metal-ligand complex and the respective ligands. Example 5 describes polymerization results obtained from metal-ligand complexes prepared according to Examples 1 to 4. It should be understood that Examples 1-4 are provided to illustrate embodiments described in this disclosure and are not intended to limit the scope of this disclosure or its appended claims.

Example 1—Synthesis of Inventive Metal-Ligand Complex 1 (IMLC-1)

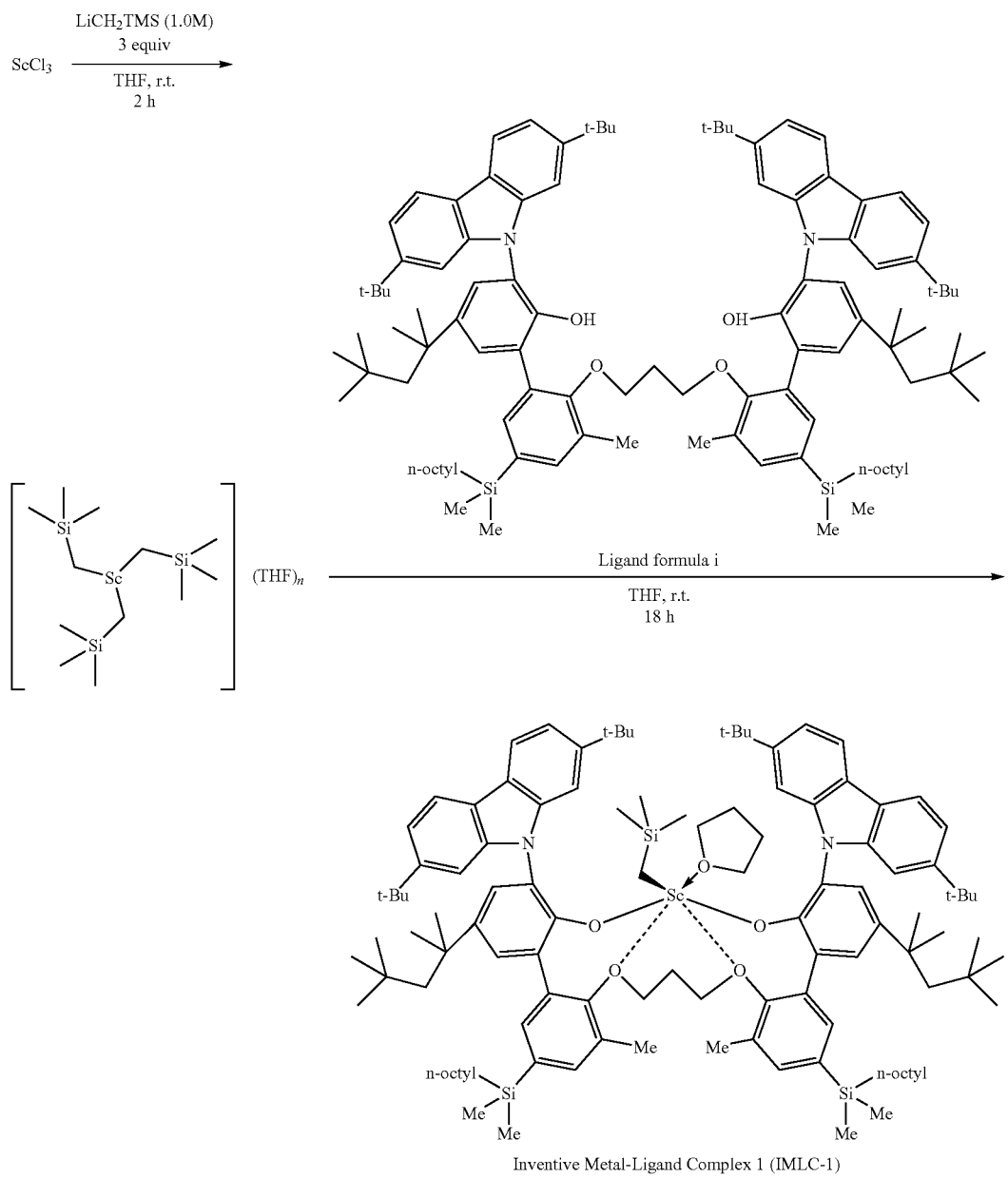

Inventive Metal-Ligand Complex 1 (IMLC-1)

In a nitrogen glove box, an oven-dried vial was charged with ScCl$_3$ (0.016 g, 0.106 mmol), THF (ca. 50 mL), and a magnetic stir bar. The mixture was cooled at −30° C. and then LiCH$_2$TMS (1.0 M in pentane, 0.35 mL, 0.35 mmol) was added dropwise and then the mixture was stirred at room temperature for 2 h. To this mixture, 1 equivalence of ligand formula i (0.168 g, 0.106 mmol) in THF (ca. 10 mL) was slowly added and the reaction mixture was stirred at room temperature for 18 hours. Solvent was then removed under reduced pressure to afford Sc-1 as a white solid (0.154 g, 82.5%).

$^1$H NMR (400 MHz, Benzene-d$_6$) δ 8.18 (dd, J=10.3, 8.2 Hz, 2H), 8.08 (dd, J=11.9, 8.3 Hz, 2H), 7.93 (d, J=1.7 Hz, 1H), 7.71 (dd, J=7.7, 1.7 Hz, 2H), 7.66 (d, J=2.8 Hz, 1H), 7.61 (d, J=2.7 Hz, 1H), 7.57 (dd, J=8.8, 1.7 Hz, 2H), 7.54-7.44 (m, 3H), 7.40-7.29 (m, 4H), 7.21 (dd, J=1.8, 0.8 Hz, 1H), 7.05 (dd, J=1.8, 0.8 Hz, 1H), 4.07 (s, 1H), 3.74-3.61 (m, 3H), 3.61-3.52 (m, 2H), 3.21-3.10 (m, 2H), 1.74 (s, 3H), 1.70-1.63 (m, 2H), 1.62 (s, 9H), 1.60-1.53 (m, 2H), 1.51 (s, 9H), 1.48 (s, 3H), 1.39-1.23 (m, 34H), 1.37 (s, 3H), 1.30 (s, 9H), 1.21 (s, 9H), 1.16-1.02 (m, 5H), 0.96-0.84 (m, 6H), 0.90 (s, 9H), 0.89 (s, 9H), 0.77 (dt, J=9.4, 6.9 Hz, 2H), 0.66 (d, J=6.8 Hz, 2H), 0.26 (s, 3H), 0.24 (s, 3H), 0.15 (s, 3H), 0.12 (s, 3H), −0.32 (s, 9H), −0.66 (d, J=12.3 Hz, 1H), −1.37 (d, J=12.3 Hz, 1H).

Preparation of ligand formula i detailed in WO2017058981 A1.

Example 2—Synthesis of Inventive Metal-Ligand Complex 2 (IMLC-2)

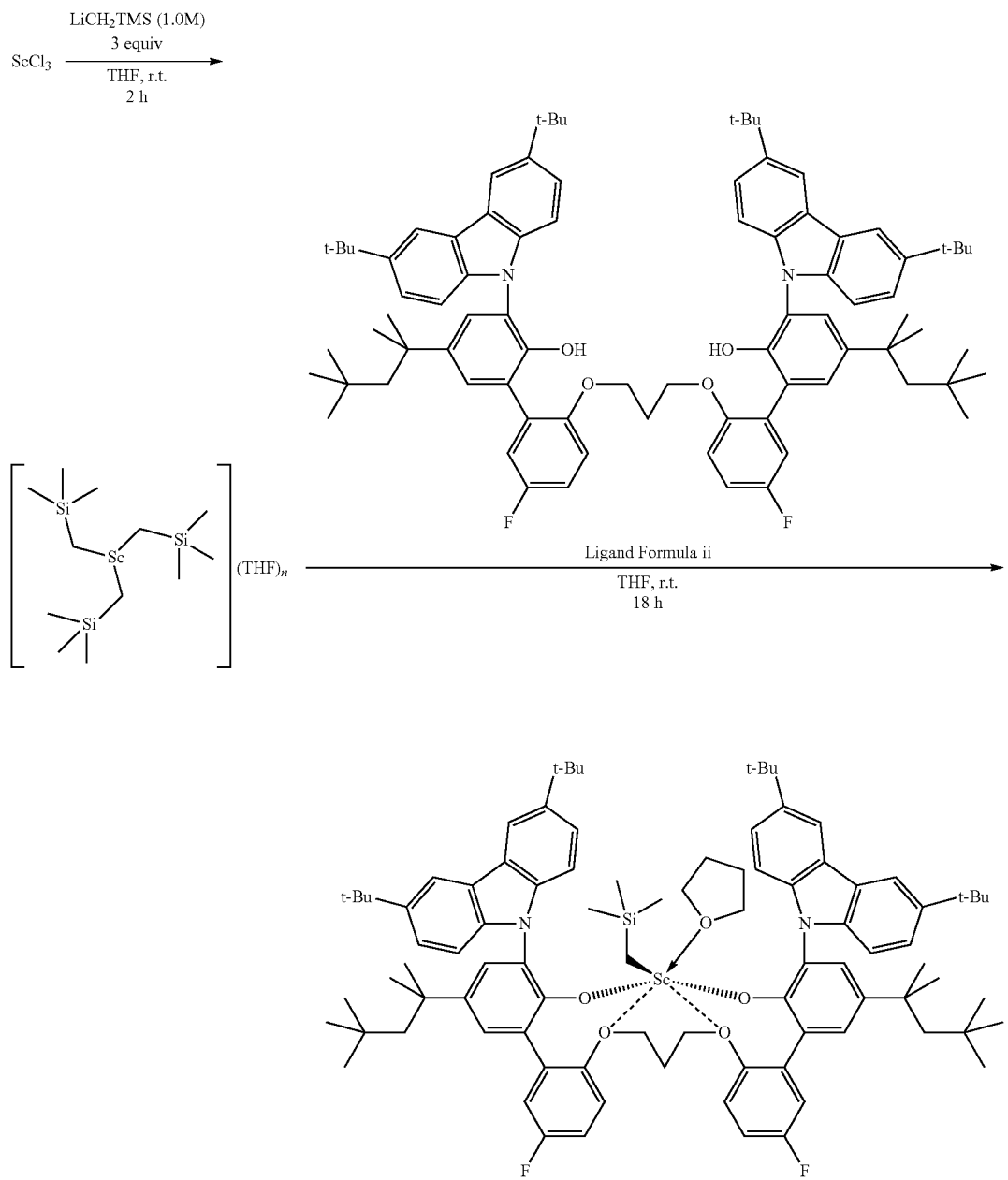

Inventive Metal-Ligand Complex 2 (IMLC-2)

In a glove box a 250 mL glass jar was charged with ScCl$_3$ (0.200 g), THF (ca. 25 mL), and a magnetic stir bar. To this was slowly added LiCH$_2$TMS (1.0 M in hexanes, 4 mL), and this mixture was allowed to stir at room temperature for 4 h. To this colorless, mostly clear mixture was added ligand formula ii (1.615 g) and an immediate darkening of the reaction mixture was observed (clear dark grey color). The reaction mixture was allowed to stir for 1 hour at room temperature after which the mixture was filtered and then the filtrate was dried in vacuo to give an off-white solid (1.076 g, 56.8% yield).

$^1$H NMR (400 MHz, Benzene-d$_6$) (Select Peaks for major product) δ 8.58 (s, 1H), 8.48 (d, J=6.9 Hz, 2H), 8.43 (s, 1H), 8.26 (s, 1H), 7.77-6.95 (m, 12H), 6.85 (s, 1H), 6.51 (d, J=4.9 Hz, 1H), 6.45-6.34 (m, 1H), 5.54 (s, 1H), 5.23 (s, 1H), 4.51 (s, 1H), 3.63 (s, 2H), 3.44 (s, 1H), 3.36 (m, 2H), 2.86 (m, 2H), 1.51 (s, 9H), 1.499 (s, 9H), 1.497 (s, 9H), 1.44 (s, 9H), 0.84 (m, 18H), −0.24 (s, 9H), −1.39-1.45 (m, 2H), −2.00 (d, J=12.7 Hz, 1H).

$^{19}$F NMR (376 MHz, Benzene-d$_6$) δ −115.52, −118.51.

Preparation of ligand formula ii detailed in WO2012027448 A1.

Example 3—Synthesis of Inventive Metal-Ligand Complex 3 (IMLC-3)

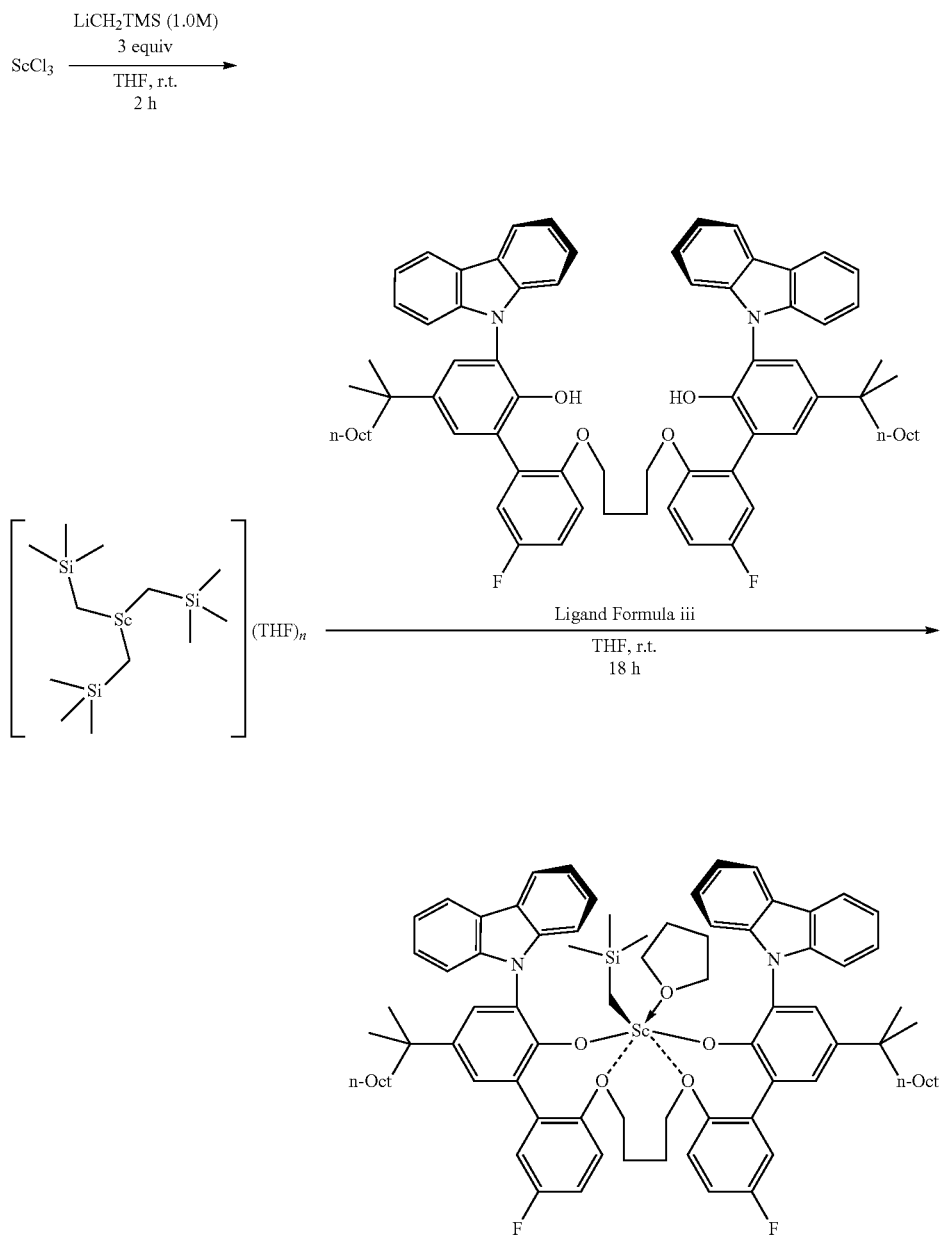

Inventive Metal-Ligand Complex 3 (IMLC-3)

In a glovebox a 250 mL glass jar was charged with ScCl$_3$ (0.217 g, 1.44 mmol), THF (ca. 100 mL), and a magnetic stir bar. LiCH$_2$TMS (1.0 M in pentane, 4.4 mL, 4.4 mmol) was added slowly and then the mixture was allowed to stir at room temperature for 2 hours. Ligand formula iii (1.583 g, 1.44 mmol) was dissolved in THF and then slowly added to the jar and the contents were stirred at room temperature for 18 h. The solvent was then removed in vacuo and the product was extracted in pentane and passed over a filtrate. The filtrate was concentrated under reduced pressure to afford an off-white solid (1.279 g, 68.3% yield).

$^1$H NMR (400 MHz, Benzene-d$_6$) δ (Select peaks major product) 8.22 (d, J=7.6 Hz, 1H), 8.19 (d, J=7.7 Hz, 1H), 8.09 (d, J=8.2 Hz, 1H), 8.04 (d, J=8.2 Hz, 1H), 7.93 (d, J=7.9 Hz, 1H), 7.63 (d, J=7.9 Hz, 1H), 7.60-7.02 (overlapping, 18H), 6.75 (ddd, J=9.0, 7.3, 3.2 Hz, 1H), 6.45-6.38 (m, 1H), 5.59 (ddd, J=8.7, 4.9, 3.7 Hz, 1H), 4.92 (dd, J=8.9, 5.1 Hz, 1H), 4.85 (dd, J=9.1, 5.0 Hz, 1H), 4.42 (t, J=12.2 Hz, 1H), 3.73-3.61 (m, 2H), 3.30-3.17 (m, 2H), −0.27 (s, 10H), −1.72 (d, J=12.7 Hz, 1H), −2.23 (d, J=12.6 Hz, 1H).

$^{19}$F NMR (376 MHz, Benzene-d$_6$) δ −116.55, −118.23.

Preparation of ligand formula iii detailed in WO2018170138A1.

Example 4—Synthesis of Inventive Metal-Ligand Complex 4 (IMLC-4)

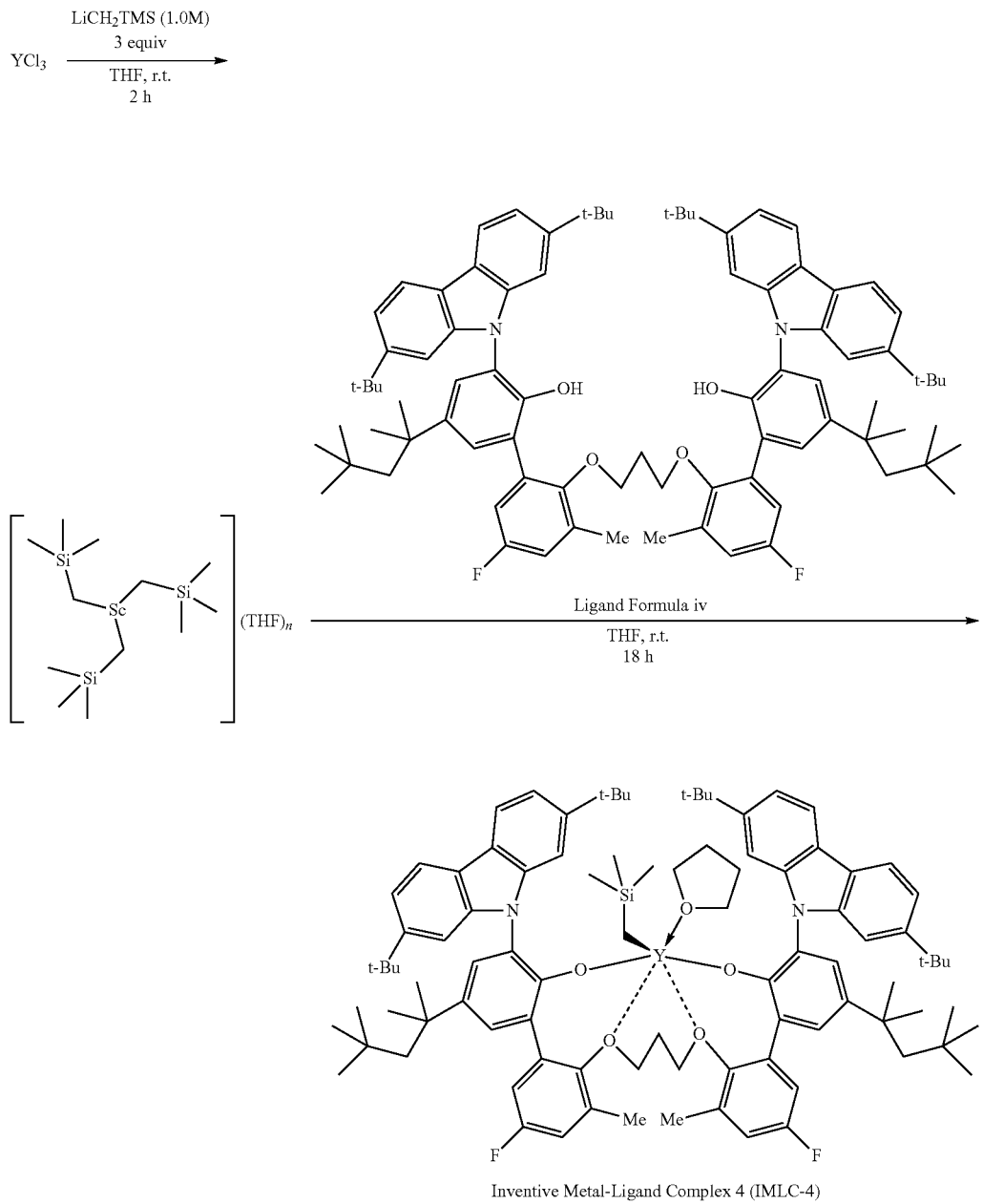

Inventive Metal-Ligand Complex 4 (IMLC-4)

In a glove box, a 250 mL glass jar was charged with YCl$_3$ (0.159 g, 0.814 mmol) and THF (ca. 50 mL). To this stirring mixture LiCH$_2$TMS (1.0 M in hexanes, 2.5 mL, 2.5 mmol) was added and the mixture was stirred for 2 h. Ligand formula iv (1.023 g, 0.8143 mmol) was dissolved in THF and then slowly added to the mixture, producing a yellow-colored mixture. The mixture was allowed to stir at room temperature for 18 h and then the solvent was removed in vacuo, affording a yellow solid. The product was extracted in hexanes and then passed through a frit. The yellow eluent was collected and dried under reduced pressure to afford a yellow solid (0.877 g, 77.7% yield).

$^1$H NMR (400 MHz, Benzene-d$_6$) (Select peaks or major product) δ 8.24 (d, J=8.3 Hz, 1H), 8.18 (d, J=8.3 Hz, 1H), 8.17 (d, J=8.8 Hz, 1H), 8.05 (d, J=8.2 Hz, 1H), 8.03 (d, J=8.2 Hz, 1H), 7.90 (d, J=8.2 Hz, 1H), 7.74 (dd, J=12.1, 1.6 Hz, 1H), 7.71 (d, J=1.7 Hz, 1H), 7.55-6.98 (m, 8H), 6.94 (dd, J=8.9, 3.2 Hz, 1H), 6.68 (dd, J=8.7, 3.1 Hz, 1H), 6.37 (dd, J=8.5, 3.1 Hz, 1H), 6.21 (dd, J=8.5, 3.2 Hz, 1H), 1.57 (s, 9H), 1.54 (s, 9H), 1.25 (s, 9H), 1.24 (s, 9H), 0.87 (s, 9H), 0.83 (s, 9H), −0.31 (s, 9H), −1.47 (dd, J=11.4, 3.5 Hz, 1H), −1.72 (dd, J=11.3, 3.7 Hz, 1H).

$^{19}$F NMR (376 MHz, Benzene-d$_6$) δ −114.37, −116.13.

Preparation of ligand formula iv detailed in WO2014105411 A1.

Example 5—Synthesis of Inventive Metal-Ligand Complex 5 (IMLC-5)

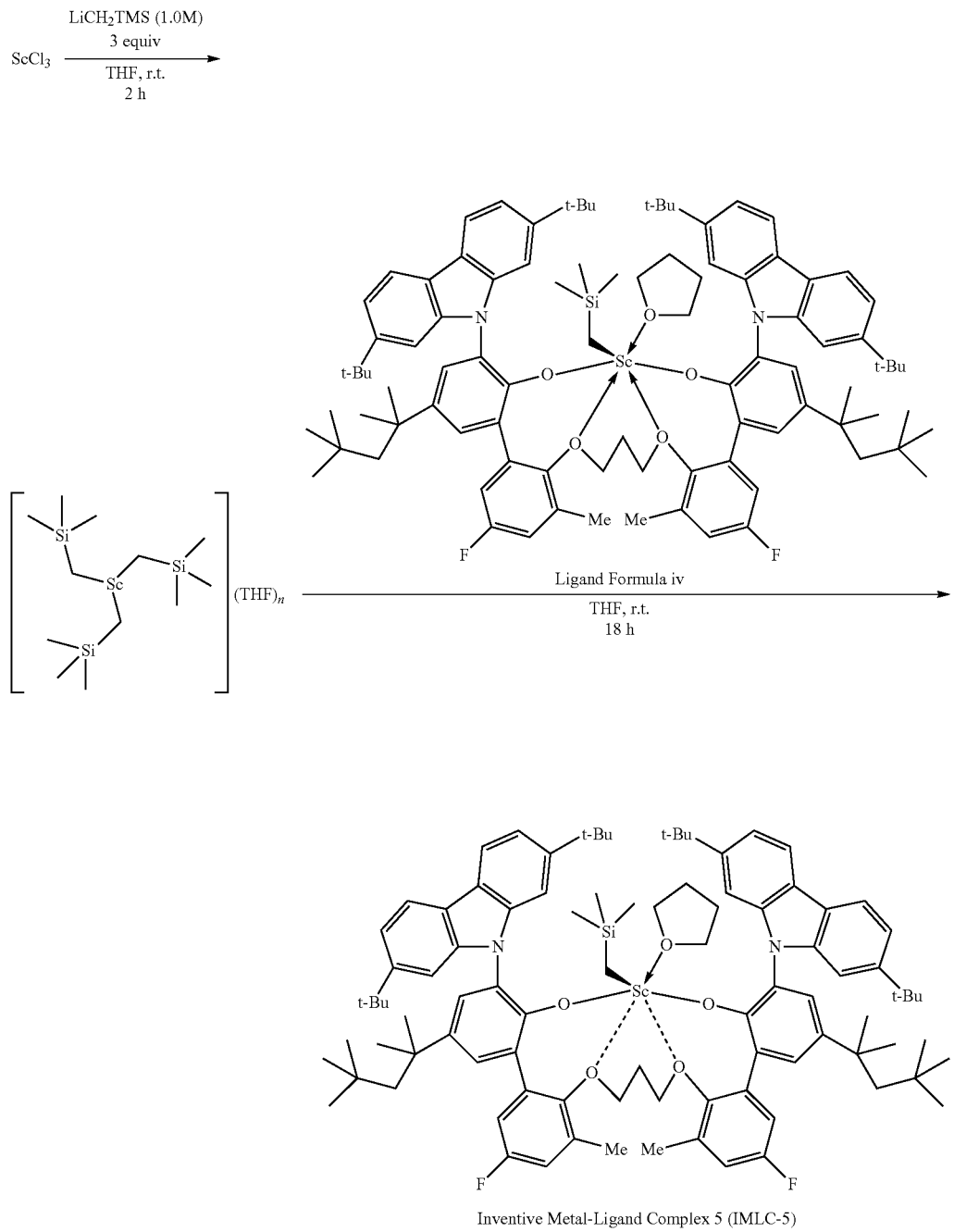

Inventive Metal-Ligand Complex 5 (IMLC-5)

In a glove box a vial is charged with $ScCl_3$ (0.027 g), THF (ca. 10 mL), and a magnetic stir bar. The mixture was cooled at −30° C. before $LiCH_2TMS$ (~0.55 mL) was added dropwise at room temperature. After being stirred for 2 h, 1 equiv of ligand formula ii (0.226 g) in THF (ca. 5 mL) was added and the reaction mixture was stirred at room temperature for 18 h. The solvent was then removed in vacuo to afford IMLC-2 as a white solid (0.074 mg, 28% yield).

$^1$H NMR (400 MHz, Benzene-$d_6$) (Select Peaks) δ 8.20 (d, J=8.2 Hz, 1H), 8.16 (d, J=8.2 Hz, 1H), 8.14-8.09 (m, 1H), 8.06 (d, J=8.3 Hz, 2H), 7.81 (d, J=1.7 Hz, 1H), 7.61 (d, J=1.6 Hz, 1H), 7.57 (d, J=2.7 Hz, 1H), 7.51-7.40 (m, 4H), 7.35-7.26 (m, 6H), 7.22-7.17 (m, 1H), 7.03 (dd, J=9.0, 3.2 Hz, 1H), 6.43-6.35 (m, 1H), 6.26-6.18 (m, 1H), 3.97-3.85 (m, 1H), 3.58-3.40 (m, 5H), 3.20-3.11 (m, 2H), 1.59 (s, 9H), 1.50 (s, 9H), 1.27 (s, 9H), 1.19 (s, 9H), 0.85 (s, 9H), 0.83 (s, 9H), −0.31 (s, 9H), −0.70 (d, J=12.3 Hz, 1H), −1.42 (d, J=12.3 Hz, 1H).

$^{19}$F NMR (376 MHz, Benzene-$d_6$) δ −115.55, −116.83.

Example 6—Synthesis of Inventive Metal-Ligand Complex 6 (IMLC-6)

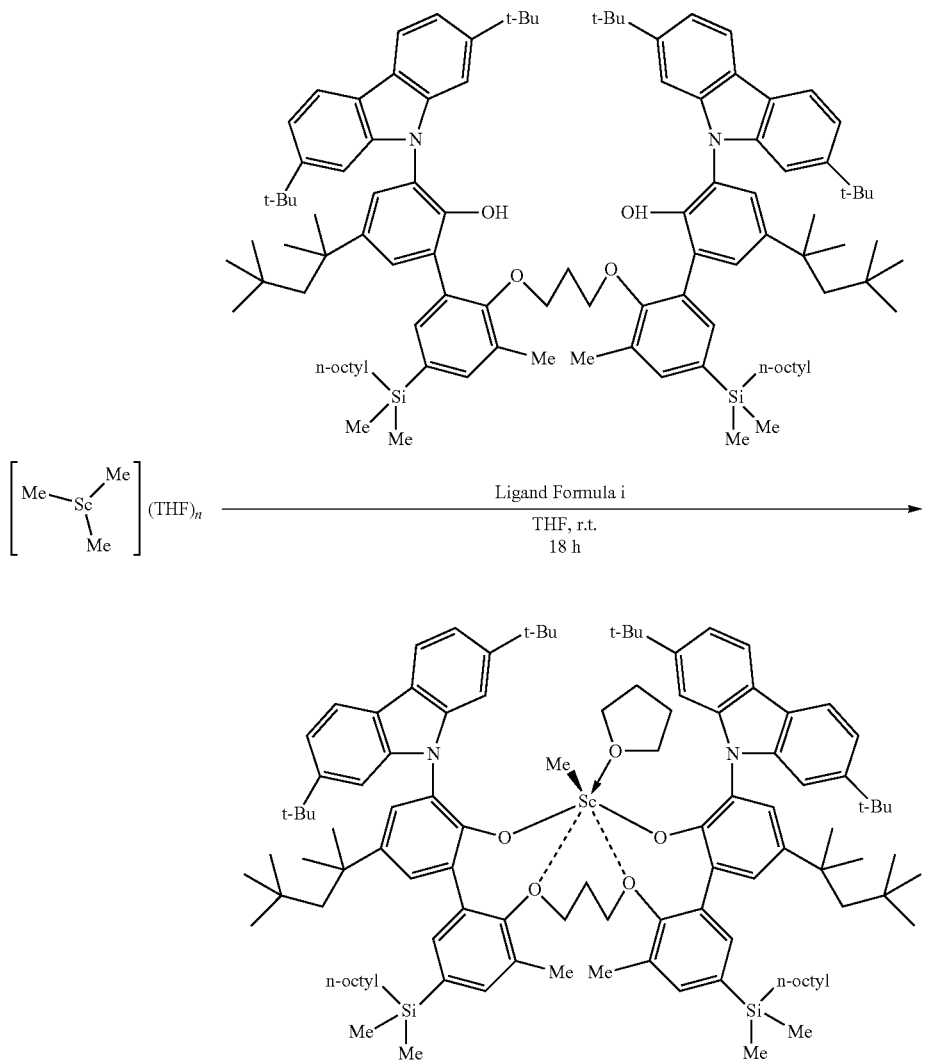

Inventive Metal-Ligand Complex 6 (IMLC-6)

In a glove box, vial was charged with $ScCl_3$ (0.145 g, 0.96 mmol) and THF (ca. 30 mL). This mixture was allowed to stir at room temperature for 3.5 h, then cooled to −35° C. and LiMe (1.6 M solution in $Et_2O$, 1.825 mL, 2.88 mmol) was then added to the vial and the resulting mixture was stirred for 10 minutes. Ligand formula i (1.500 g, 0.96 mmol) was added as a solid and the reaction mixture as then stirred overnight at room temperature. The THF was then removed in vacuo and the resulting residue was taken up in pentane and filtered. The filtrate was collected and dried in vacuo to give IMLC-6 as a white solid (1.614 g, 99%).

$^1$H NMR (400 MHz, Benzene-$d_6$) δ 8.26 (d, J=8.2 Hz, 1H), 8.19 (d, J=8.3 Hz, 1H), 8.17 (d, J=1.3 Hz, 1H), 8.09 (d, J=8.2 Hz, 1H), 7.96 (d, J=8.2 Hz, 1H), 7.81 (d, J=2.5 Hz, 1H), 7.71-7.67 (m, 2H), 7.62-7.57 (m, 2H), 7.54 (dd, J=4.8, 2.0 Hz, 2H), 7.49-7.45 (m, 2H), 7.45-7.41 (m, 2H), 7.35 (dd, J=8.3, 1.6 Hz, 1H), 7.23 (dd, J=8.2, 1.6 Hz, 1H), 7.02 (s, 1H), 4.34-4.15 (m, 1H), 3.88-3.77 (m, 1H), 3.68-3.57 (m, 1H), 3.48 (m, 1H), 3.21 (m, 2H), 2.84 (q, J=6.5, 6.0 Hz, 2H), 2.14 (s, 2H), 1.81-1.72 (m, 4H), 1.68 (s, 9H), 1.58 (m, 2H), 1.50 (s, 3H), 1.49 (s, 9H), 1.40-1.21 (m, 37H), 1.183 (s, 9H), 1.180 (s, 9H), 1.02 (q, J=6.4, 5.9 Hz, 4H), 0.97 (s, 9H), 0.96-0.91 (m, 6H), 0.90 (s, 9H), 0.71 (m, 4H), 0.19-0.17 (m, 6H), 0.17 (s, 3H), 0.14 (s, 3H), −1.13 (s, 3H).

Example 7—Synthesis of Inventive Metal-Ligand Complex 7 (IMLC-7)

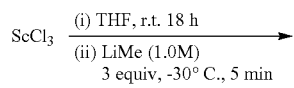

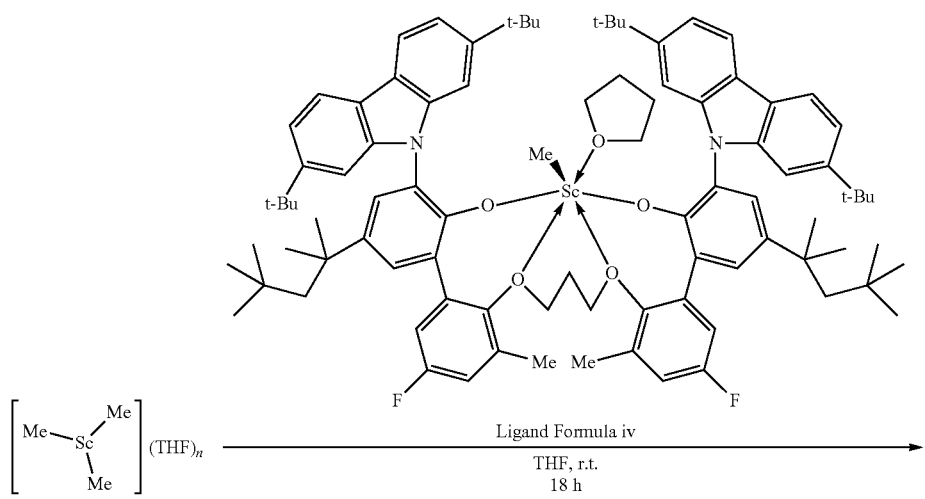

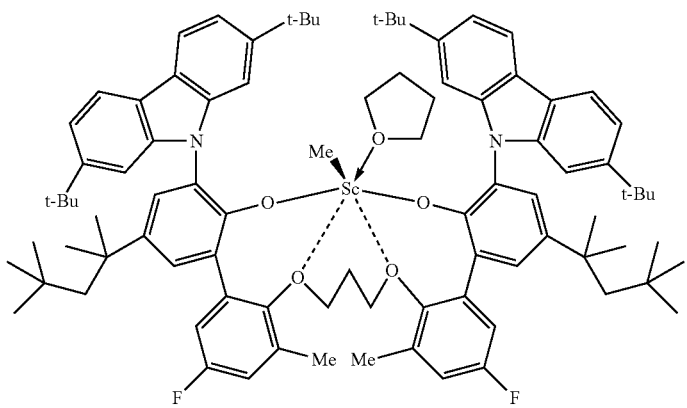

Inventive Metal-Ligand Complex 7 (IMLC-7)

In a glove box, a 40 mL glass vial was charged with $ScCl_3$ (0.021 g, 0.14 mmol) and THF (ca. 10 mL). This mixture was allowed to stir at room temperature overnight (18 h), after which time the contents of the vial were cooled to −30° C. for 20 min. LiMe (1.6 M solution in $Et_2O$, 0.27 mL, 0.43 mmol) was then added to the vial and the resulting mixture was stirred for 5 minutes. A solution of Ligand formula iv (0.175 g, 0.139 mmol) in THF (ca. 10 mL) was added to the vial. The contents of the vial were stirred at room temperature for 18 h, after which time the solvent was removed in vacuo. The residue was taken up in pentane and filtered over a fritted column. The filtrate was collected and dried in vacuo to give IMLC-7 as a white solid in quantitative yield.

$^1$H NMR (400 MHz, Benzene-$d_6$) δ 8.23 (dd, J=8.2, 1.6 Hz, 2H), 8.13 (d, J=8.2 Hz, 1H), 8.04 (d, J=1.7 Hz, 1H), 7.94 (d, J=8.2 Hz, 1H), 7.76 (d, J=2.6 Hz, 1H), 7.64 (d, J=1.6 Hz, 1H), 7.51 (d, J=1.2 Hz, 2H), 7.47 (dd, J=8.2, 1.7 Hz, 2H), 7.42 (dd, J=8.3, 1.7 Hz, 1H), 7.39 (d, J=1.6 Hz, 1H), 7.33 (dd, J=9.0, 2.7 Hz, 2H), 7.21 (dd, J=8.2, 1.7 Hz, 1H), 7.12-7.07 (m, 1H), 6.93 (dd, J=9.0, 3.2 Hz, 1H), 6.35 (s, 1H), 6.22-6.02 (m, 1H), 4.16 (d, J=2.2 Hz, 1H), 3.68 (s, 1H), 3.46 (d, J=3.0 Hz, 1H), 3.35 (s, 1H), 3.13 (s, 2H), 2.83 (d, J=8.9 Hz, 2H), 2.11 (s, 2H), 1.90 (s, 3H), 1.75-1.65 (m, 4H), 1.63 (s, 9H), 1.59-1.51 (m, 3H), 1.49 (s, 9H), 1.46-1.43 (m, 1H), 1.31 (s, 3H), 1.25 (s, 3H), 1.22 (s, 9H), 1.19 (s, 3H), 1.19 (s, 3H), 1.13 (s, 9H), 1.00 (s, 3H), 0.93 (s, 9H), 0.86 (s, 9H), −1.13 (s, 3H).

$^{19}$F NMR (376 MHz, Benzene-$d_6$) δ −116.50, −116.53.

Example 8—Synthesis of Inventive Metal-Ligand Complex 8 (IMLC-8)

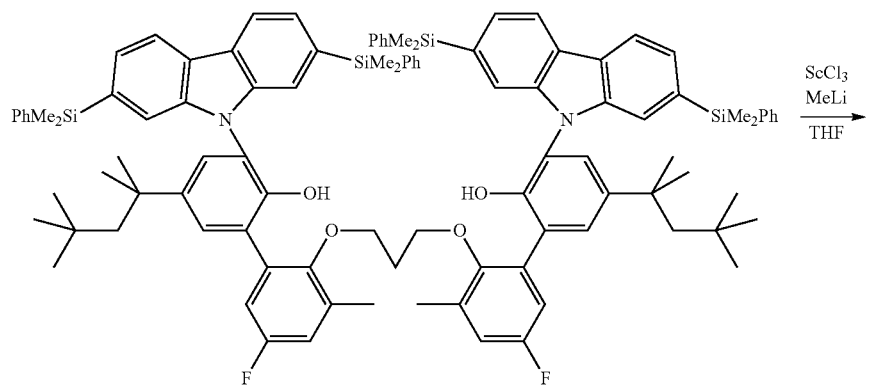

Ligand formula v

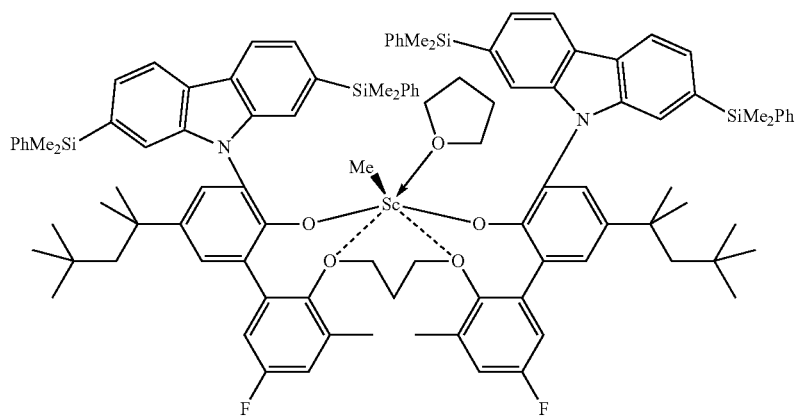

Inventive Metal-Ligand Complex 8 (IMLC-8)

In a glovebox, a 20 mL vial was charged with $ScCl_3$ (27.0 mg, 0.179 mmol, 1.00 equiv) and 4.5 mL dry THF. The mixture was allowed to stir overnight at ambient temperature. After ~16 hours, the slurry was placed in a glovebox freezer for 1 hour. The vial was then removed from the glovebox, and treated with methyl lithium (1.53 M in diethyl ether, 0.362 mL, 0.554 mmol, 3.1 equiv). The mixture became homogeneous within a minute. Less than 2 minutes after addition of methyllithium, of Ligand formula v (2',2'''-(propane-1,3-diylbis(oxy))bis(3-(2,7-bis(dimethyl(phenyl)silyl)-9H-carbazol-9-yl)-5'-fluoro-3'-methyl-5-(2,4,4-trimethylpentan-2-yl)-[1,1'-biphenyl]-2-ol)) was added (280 mg, 0.179 mmol, 1.00 equiv). The mixture stirred for 4 hours, and solvent was removed by vacuum pump.

The solid residue was mixed with 5 mL dry 1:1 hexane:toluene, and the slurry was filtered through a 0.45 um syringe filter. The filtrate was concentrated to a white solid. 266 mg of solid was recovered (87%).

$^1$H NMR (500 MHz, $CD_2Cl_2$) δ 8.26-8.21 (m, 1H), 8.19-8.15 (m, 1H), 8.12 (dd, J=7.7, 0.8 Hz, 1H), 7.95 (td, J=7.3, 0.8 Hz, 1H), 7.93 (d, J=1.0 Hz, 1H), 7.65-7.58 (m, 3H), 7.52 (dd, J=7.6, 0.9 Hz, 1H), 7.51-7.47 (m, 4H), 7.40-7.38 (m, 3H), 7.36-7.32 (m, 5H), 7.32-7.29 (m, 2H), 7.28-7.16 (m, 13H), 6.86-6.82 (m, 1H), 6.54 (ddd, J=13.3, 8.9, 3.3 Hz, 2H), 6.14 (dd, J=8.5, 3.1 Hz, 1H), 4.01-3.83 (m, 1H), 3.61-3.54 (m, 1H), 3.54-3.39 (m, 2H), 2.72-2.62 (m, 2H), 2.53-2.43 (m, 2H), 1.75 (dd, J=14.4, 2.1 Hz, 2H), 1.67-1.50 (m, 4H), 1.42 (s, 3H), 1.39 (s, 3H), 1.34-1.26 (m, 12H), 0.78 (s, 9H), 0.76-0.72 (m, 13H), 0.66 (s, 3H), 0.61 (s, 3H), 0.60 (s, 3H), 0.36 (s, 3H), 0.35 (s, 3H), 0.34 (s, 3H), 0.18 (s, 3H), −1.72 (s, 3H).

$^{13}$C NMR (126 MHz, $CD_2Cl_2$) δ 160.84, 160.34, 158.90, 158.40, 155.98, 155.42, 149.09, 149.07, 148.64, 148.62, 142.24, 141.24, 139.97, 139.94, 139.21, 139.00, 138.99, 138.61, 136.96, 136.90, 136.64, 136.57, 136.47, 135.40, 134.99, 134.86, 134.79, 134.35, 134.33, 134.30, 134.27, 134.16, 134.12, 134.09, 134.08, 134.02, 133.98, 133.29, 129.68, 129.25, 128.92, 128.71, 128.66, 128.63, 128.48, 128.11, 127.90, 127.78, 127.77, 127.58, 127.57, 127.53, 127.50, 127.43, 125.74, 125.08, 124.92, 124.66, 124.59, 124.41, 124.38, 123.44, 122.99, 119.99, 119.58, 119.29, 118.88, 118.83, 117.72, 117.56, 117.23, 117.05, 116.10, 115.85, 115.67, 115.06, 114.88, 77.80, 74.14, 70.75, 57.74, 56.98, 37.67, 37.66, 33.28, 32.44, 32.30, 32.25, 31.62, 30.14, 30.01, 29.62, 24.18, 24.15, 17.08, 15.05, −2.06, −2.25, −2.38, −2.42, −2.48, −2.53, −2.76, −2.82.

$^{19}$F NMR (470 MHz, $CD_2Cl_2$) δ-118.07 (t, J=8.9 Hz), −118.36 (t, J=8.8 Hz).

Example 9—1-(ethoxymethoxy)-4-(2,4,4-trimethyl-pentan-2-yl)benzene

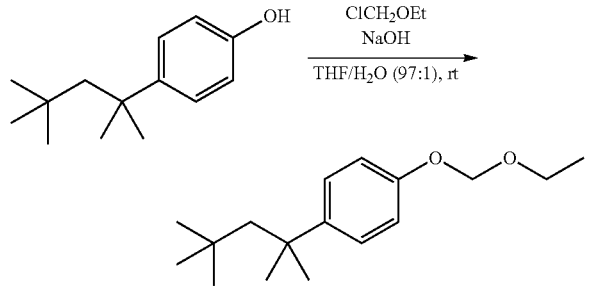

A clear, colorless solution of the 4-(2,4,4-trimethylpentan-2-yl)phenol (10.091 g, 48.909 mmol, 1.00 eq) in THF (300 mL) and H$_2$O (3 mL) was sparged under positive flow of nitrogen for 1 hr upon which an aqueous solution of NaOH (7.8 mL, 97.818 mmol, 2.00 eq, 50% w/w) was added via syringe in a quick dropwise manner. After stirring (500 rpm) for 20 mins at 23° C., neat chloromethyl ethyl ether (13.6 mL, 146.73 mmol, 3.00 eq) was added via syringe in a quick dropwise manner to the clear colorless solution. After stirring for 2 hrs at 23° C., the now white heterogeneous mixture was diluted with aqueous NaOH (150 mL, 1N), THF was removed via rotary evaporation, the resultant white biphasic mixture was diluted with CH$_2$Cl$_2$ (100 mL), poured into a separatory funnel, partitioned, organics were washed with aqueous NaOH (2×50 mL, 1N), residual organics were extracted from the aqueous (2×25 mL), combined, dried over solid Na$_2$SO$_4$, decanted, and concentrated. The resultant pale yellow oil was diluted in CH2Cl2 (20 mL), suction filtered through a silica gel pad, rinsed with CH$_2$Cl$_2$ (4×50 mL), and the filtrate was concentrated to afford the phenolic methyl ethyl ether as a clear colorless oil (12.800 g, 48.420 mmol, 99%).

$^1$H NMR (400 MHz, CDCl$_3$) δ 7.29-7.22 (m, 2H), 6.98-6.90 (m, 2H), 5.19 (d, J=1.1 Hz, 2H), 3.72 (q, J=7.1 Hz, 2H), 1.69 (s, 2H), 1.33 (s, 6H), 1.21 (t, J=7.1 Hz, 3H), 0.71 (s, 9H).

$^{13}$C NMR (101 MHz, CDCl$_3$) δ 155.01, 143.38, 127.01, 115.44, 93.30, 64.08, 56.99, 37.99, 32.30, 31.75, 31.59, 15.10.

Example 10—(2-(ethoxymethoxy)-5-(2,4,4-trimethylpentan-2-yl)phenyl)trimethylsilane

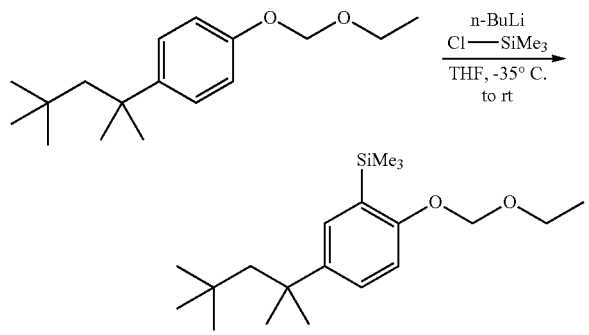

In a continuous purge, nitrogen filled glovebox, a clear, colorless solution of the protected phenol (5.000 g, 18.910 mmol, 1.00 eq) in anhydrous deoxygenated THF (100 mL) was placed in a freezer cooled to −35° C. for 2 hrs upon which a solution of n-BuLi (15.4 mL, 24.583 mmol, 1.30 eq, 2.6 M in hexanes) was added via syringe in a quick dropwise manner. The now golden yellow solution was allowed to sit in the freezer for 45 mins, removed, stirred (300 rpm) at 23° C. for 2 hrs, the now dark golden yellow solution was placed back in the freezer cooled to −35° C. for 1 hr, neat chlorotrimethylsilane (3.60 mL, 28.365 mmol, 1.50 eq) was then added neat via syringe in a quick dropwise manner, after 20 mins the now white mixture was removed from the freezer, and stirred (300 rpm) at 23° C. for 2 hrs. The resultant clear colorless solution was removed from the glovebox, neutralized with a saturated aqueous NaHCO$_3$ mixture, diluted with CH$_2$Cl$_2$ (100 mL), poured into a separatory funnel, partitioned, organics were washed with saturated aqueous NaHCO$_3$ mixture (1×50 mL), residual organics were extracted from the aqueous (2×25 mL), combined, dried over solid Na$_2$SO$_4$, decanted, and concentrated. The resultant pale yellow oil was diluted in CH$_2$Cl$_2$ (10 mL), suction filtered through a silica gel pad, rinsed with CH$_2$Cl$_2$ (4×25 mL), and the filtrate was concentrated to afford the protected phenol as a clear pale yellow oil (5.365 g, 15.939 mmol, 84%).

$^1$H NMR (400 MHz, CDCl$_3$) δ 7.36 (d, J=2.6 Hz, 1H), 7.29-7.24 (m, 1H), 6.96 (d, J=8.6 Hz, 1H), 5.20 (s, 2H), 3.71 (q, J=7.0 Hz, 2H), 1.69 (s, 2H), 1.35 (s, 6H), 1.22 (t, J=7.1 Hz, 3H), 0.71 (s, 9H), 0.27 (s, 9H).

$^{13}$C NMR (101 MHz, CDCl$_3$) δ 159.89, 142.26, 132.63, 128.10, 126.78, 111.69, 92.67, 64.02, 57.10, 38.03, 32.31, 31.76, 31.53, 15.10, −0.77.

Example 11—(2-(ethoxymethoxy)-3-(4,4,5,5-tetramethyl-1,3,2-dioxaborolan-2-yl)-5-(2,4,4-trimethylpentan-2-yl)phenyl)trimethylsilane

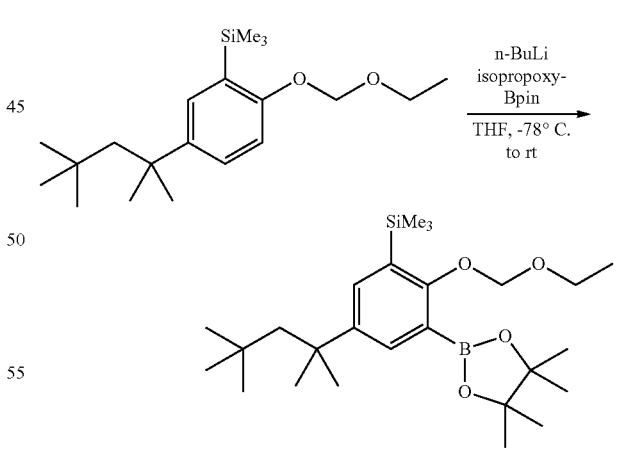

A 500 mL round bottom flask was charged with (2-(ethoxymethoxy)-5-(2,4,4-trimethylpentan-2-yl)phenyl)trimethylsilane (16.9 g, 50.2 mmol. 1.00 equiv) and 148 mL dry THF. The solution was cooled to −78° C. under a blanket of nitrogen. N-butyllithium (2.5 M in hexane, 22.1 mL, 55.2 mmol, 1.10 equiv) was added dropwise. The mixture was stirred at −78° C., and was allowed to warm to room temperature over 2 hours.

The flask was returned to the −78° C. bath, and isopropoxy-Bpin (12.3 mL, 60.3 mmol, 1.20 equiv) was injected. The mixture was allowed to gradually warm to ambient temperature over 3 hours.

The solution was quenched with sat. aq. Ammonium chloride. Phases were separated, and the aqueous phase was extracted with a few portions of dichloromethane. Combined organic fractions were concentrated and the residue purified by chromatography on silica gel (0 to 10% EtOAc in hexane). 11.434 g of product was isolated as a colorless oil (49%).

$^1$H NMR (500 MHz, CDCl$_3$) δ 7.66 (d, J=2.7 Hz, 1H), 7.51 (d, J=2.8 Hz, 1H), 5.17 (s, 2H), 3.68 (q, J=7.1 Hz, 2H), 1.71 (s, 2H), 1.36 (d, J=5.8 Hz, 18H), 1.19 (t, J=7.1 Hz, 3H), 0.69 (s, 9H), 0.31 (s, 9H).

$^{13}$C NMR (126 MHz, CDCl$_3$) δ 165.13, 143.13, 136.57, 135.41, 130.36, 98.70, 83.56, 65.55, 56.97, 38.11, 32.33, 31.81, 31.57, 24.82, 15.16, −0.13.

Example 12—1,3-bis((2'-(ethoxymethoxy)-5-fluoro-3-methyl-5'-(2,4,4-trimethylpentan-2-yl)-3'-(trimethylsilyl)-[1,1'-biphenyl]-2-yl)oxy)propane

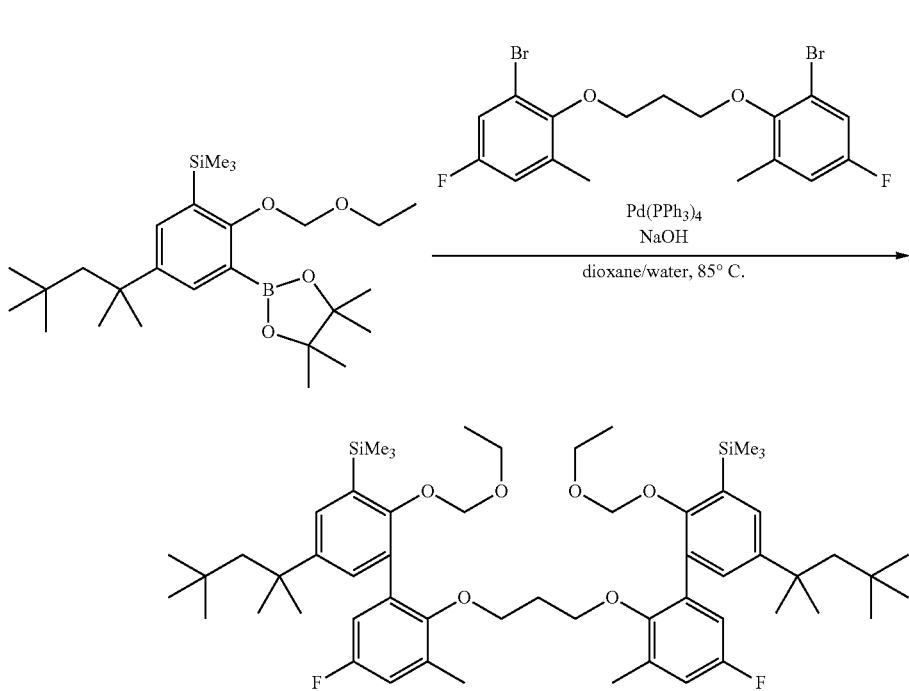

A 500 mL round bottom flask was charged with (2-(ethoxymethoxy)-3-(4,4,5,5-tetramethyl-1,3,2-dioxaborolan-2-yl)-5-(2,4,4-trimethylpentan-2-yl)phenyl)trimethylsilane (11.4 g, 24.6 mmol, 2.20 equiv), 1,3-bis(2-bromo-4-fluoro-6-methylphenoxy)propane (5.04 g, 11.2 mmol, 1.00 equiv), sodium hydroxide (4.03 g, 101 mmol, 9.00 equiv), and Pd(PPh$_3$)$_4$ (1.29 g, 1.12 mmol, 10 mol %). A reflux condenser was attached, and the unit was placed under a nitrogen atmosphere. 130 mL of nitrogen-sparged 6:1 dioxane:water was added, and the mixture was stirred at 85° C. under nitrogen.

After 14 hours, the solution was cooled and quenched with brine. The phases were separated and the aqueous phase extracted with two portions of dichloromethane. Combined organic fractions were concentrated and the residue was purified by chromatography on silica gel (0 to 10% EtOAc in hexane). 9.33 g of product was isolated as a clear, colorless oil (86%).

$^1$H NMR (400 MHz, CDCl$_3$) δ 7.39 (d, J=2.5 Hz, 2H), 7.23 (d, J=2.5 Hz, 2H), 6.88 (dd, J=8.9, 3.2 Hz, 2H), 6.82 (dd, J=8.9, 3.1 Hz, 2H), 4.59 (s, 4H), 3.61-3.02 (m, 8H), 2.20 (s, 6H), 1.69 (s, 4H), 1.40 (t, J=6.5 Hz, 2H), 1.31 (s, 12H), 0.97 (t, J=7.1 Hz, 6H), 0.68 (s, 18H), 0.29 (s, 18H).

$^{13}$C NMR (101 MHz, CDCl$_3$) δ 159.32, 157.12, 156.92, 151.31, 151.29, 144.35, 134.86, 134.77, 133.04, 132.96, 132.92, 131.98, 130.61, 129.36, 129.35, 116.22, 116.00, 115.74, 115.52, 97.55, 69.38, 64.88, 56.85, 38.16, 32.31, 31.82, 30.91, 16.77, 16.76, 14.86, −0.16.

$^{19}$F NMR (470 MHz, CDCl$_3$) δ−120.59 (t, J=8.8 Hz).

Preparation of 1,3-bis(2-bromo-4-fluoro-6-methylphenoxy)propane detailed in WO2020047384 A1.

Example 13—1,3-bis((2'-(ethoxymethoxy)-5-fluoro-3'-iodo-3-methyl-5'-(2,4,4-trimethylpentan-2-yl)-[1,1'-biphenyl]-2-yl)oxy)propane

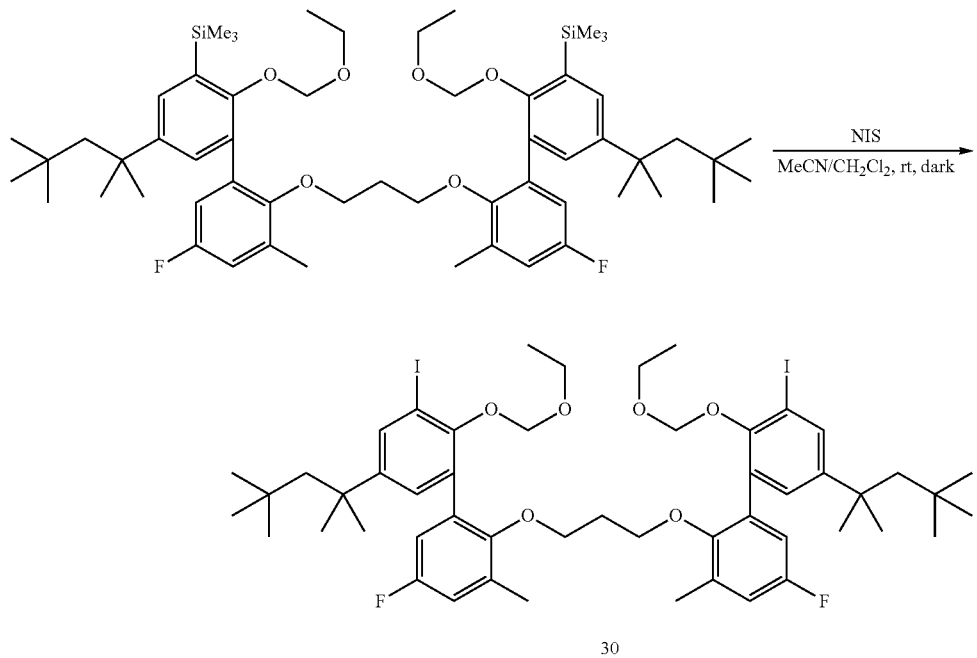

A 500 mL round bottom flask was charged with 1,3-bis ((2'-(ethoxymethoxy)-5-fluoro-3-methyl-5'-(2,4,4-trimethylpentan-2-yl)-3'-(trimethylsilyl)-[1,1'-biphenyl]-2-yl)oxy) propane (9.00 g, 9.36 mmol, 1.00 equiv). The solid was dissolved in 130 mL acetonitrile and 100 mL dichloromethane. The mixture was protected from light and treated with n-iodosuccinimide (14.7 g, 65.5 mmol, 7.00 equiv). The mixture stirred for 24 hours.

Only partial conversion was observed by TLC, and an additional 7.00 g of NIS was added. The mixture stirred for 6 days. TLC showed near-completion. A final 5.00 g of NIS was added, and the mixture stirred for an additional 24 hours.

The reaction was quenched with aq. Sodium thiosulfate solution. Product was extracted with several portions of dichloromethane. Combined organic fractions were washed with 5% NaOH. The organic phase was concentrated, and the residue purified by chromatography on silica gel (0 to 10% EtOAc in hexane). 8.314 g of product was isolated as a clear, colorless oil (83%).

$^1$H NMR (400 MHz, CDCl$_3$) δ 7.74 (d, J=2.3 Hz, 2H), 7.25 (d, J=2.4 Hz, 2H), 6.91-6.78 (m, 4H), 4.77 (s, 4H), 3.40 (s, 4H), 3.29 (q, J=7.1 Hz, 4H), 2.22 (s, 6H), 1.68 (s, 4H), 1.47 (p, J=6.6 Hz, 2H), 1.30 (s, 12H), 0.94 (t, J=7.1 Hz, 6H), 0.73 (s, 18H).

$^{13}$C NMR (101 MHz, CDCl$_3$) δ 159.26, 156.86, 152.18, 151.21, 151.18, 147.89, 136.98, 133.50, 133.41, 133.27, 133.18, 131.66, 131.64, 129.66, 116.78, 116.56, 115.66, 115.43, 98.00, 92.56, 69.88, 65.32, 56.65, 38.18, 32.39, 31.88, 30.76, 16.82, 14.76.

$^{19}$F NMR (376 MHz, CDCl$_3$) δ−120.29 (t, J=8.7 Hz).

Example 14—2,7-bis(dimethyl(phenyl)silyl)-9H-carbazole

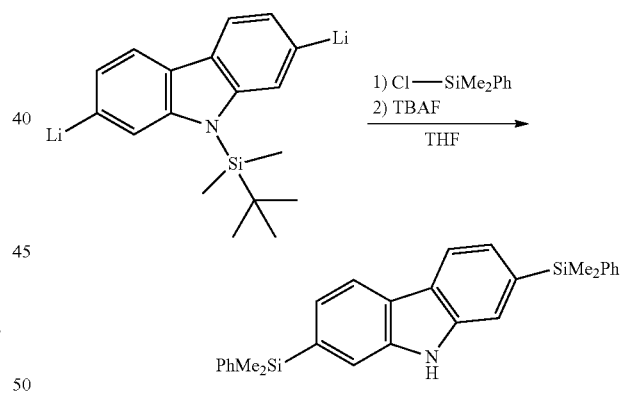

In a glovebox, a 50 mL jar was charged with 2,7-dilithio-9-(tert-butyldimethylsilyl)-9H-carbazole (1.00 g, 3.41 mmol, 1.00 equiv) and 17 mL dry THF. Chlorodimethylphenylsilane (1.72 mL, 10.2 mmol, 3.00 equiv) was added, and the mixture stirred for 45 minutes. Solid organolithium quickly dissolved as the reaction progressed.

The clear, colorless solution was quenched with aq. Ammonium chloride. Product was extracted with several portions of dichloromethane. Combined organic fractions were concentrated. The solution was dried with Na$_2$SO$_4$, filtered through basic alumina, and concentrated to a white solid. 2.021 g of a crude white solid was isolated and used without further purification.

The carbazole was dissolved in 10 mL THF, and was treated with tetrabutylammonium fluoride trihydrate (2.02 g, 3.41 mmol, 1.00 equiv). The mixture stirred for 20 minutes, and TLC indicated complete consumption of the starting material. The solution was quenched with aq. Ammonium chloride. Product was extracted with several portions of dichloromethane. Combined organic fractions were concentrated, and the residue purified by chromatography on silica gel (0 to 20% EtOAc in hexane). 0.803 g of product was isolated as a white solid (54% over two steps).

$^1$H NMR (500 MHz, CDCl$_3$) δ 8.06 (d, J=7.7 Hz, 2H), 7.87 (s, 1H), 7.60-7.49 (m, 6H), 7.44-7.31 (m, 8H), 0.62 (s, 12H).

$^{13}$C NMR (126 MHz, CDCl$_3$) δ 139.31, 138.62, 135.79, 134.27, 129.07, 127.81, 124.85, 123.93, 119.93, 116.52, −2.07.

Preparation of 2,7-dilithio-9-(tert-butyldimethylsilyl)-9H-carbazole detailed in WO2017058981 A1.

Example 15 Preparation of Ligand Formula (v)

In a glovebox, a 50 mL round bottom flask was charged with 1,3-bis((2'-(ethoxymethoxy)-5-fluoro-3'-iodo-3-methyl-5'-(2,4,4-trimethylpentan-2-yl)-[1,1'-biphenyl]-2-yl)oxy)propane (0.500 g, 0.468 mmol, 1.00 equiv), 2,7-bis(trimethylgermyl)-9H-carbazole (0.500 g, 0.468 mmol, 1.00 equiv), the 2,7-bis(dimethyl(phenyl)silyl)-9H-carbazole (0.448 g, 1.03 mmol, 2.20 equiv), K$_3$PO$_4$ (0.596 g, 2.81 mmol, 6.00 equiv), CuI (89 mg, 0.47 mmol, 1.0 equiv), N,N'-dimethylethylenediamine (0.081 mL, 0.75 mmol, 1.6 equiv), and 6 mL toluene. A reflux condenser was attached, the unit was sealed with a rubber septum, and was transferred to a fume hood. The mixture was allowed to stir at 120° C. under a blanket of nitrogen for 48 hours. An additional portion of CuI (89 mg) and DMEDA (0.081 mL) were added. Stirring continued for another 48 hours. The solution was cooled, diluted with dichloromethane, and the slurry filtered through a plug of alumina. The filtrate was concentrated, and the residue purified by chromatography on

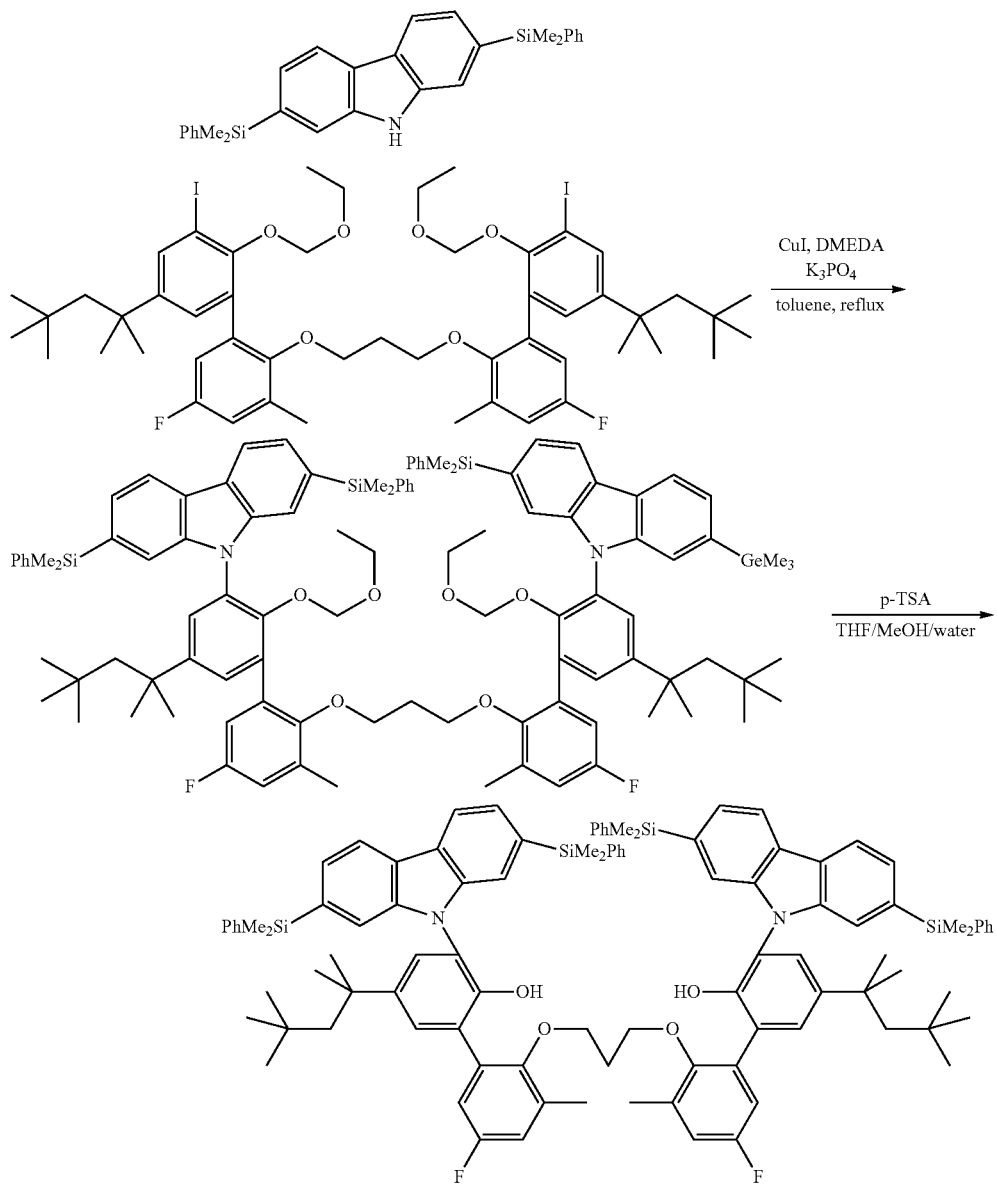

silica gel (0 to 10% EtOAc in hexane). 177 mg of the desired intermediate was isolated and taken onto the next step.

The intermediate was dissolved in 6 mL of 1:1 THF:methanol. This was treated with 20 mg of p-toluenesulfonic acid monohydrate, and was allowed to reflux for 5 hours. TLC showed complete consumption of the starting material. The solution was cooled, and diluted with dichloromethane and water. Phases were separated, and the aqueous phase extracted with a few additional portions of dichloromethane. Combined organic fractions were concentrated and purified by chromatography on silica gel (0 to 20% EtOAc in hexane). 129 mg of product was isolated as a white solid (18% yield over two steps).

1H NMR (400 MHz, CDCl$_3$) δ 8.13 (d, J=7.8 Hz, 4H), 7.46-7.33 (m, 16H), 7.28 (s, 4H), 7.24-7.06 (m, 12H), 6.88 (dd, J=8.9, 3.2 Hz, 2H), 6.77 (dd, J=8.6, 3.1 Hz, 2H), 6.43 (s, 2H), 3.42 (t, J=6.3 Hz, 4H), 1.73 (s, 6H), 1.68 (s, 4H), 1.50-1.39 (m, 2H), 1.32 (s, 12H), 0.71 (s, 18H), 0.57-0.36 (m, 24H).

13C NMR (101 MHz, CDCl$_3$) δ 160.13, 157.70, 149.85, 149.82, 147.58, 142.93, 140.99, 138.48, 135.61, 134.15, 134.09, 133.62, 133.54, 132.81, 132.72, 128.97, 128.87, 127.71, 127.65, 127.61, 127.40, 126.39, 125.34, 124.92, 124.03, 119.87, 117.31, 117.09, 116.17, 115.94, 115.67, 70.96, 57.02, 38.16, 32.39, 31.83, 31.58, 30.47, 16.19, −2.04, −2.10.

19F NMR (470 MHz, CDCl$_3$) δ −118.16 (m).

Example 16—Synthesis of Inventive Metal-Ligand Complex 9 (IMLC-9)

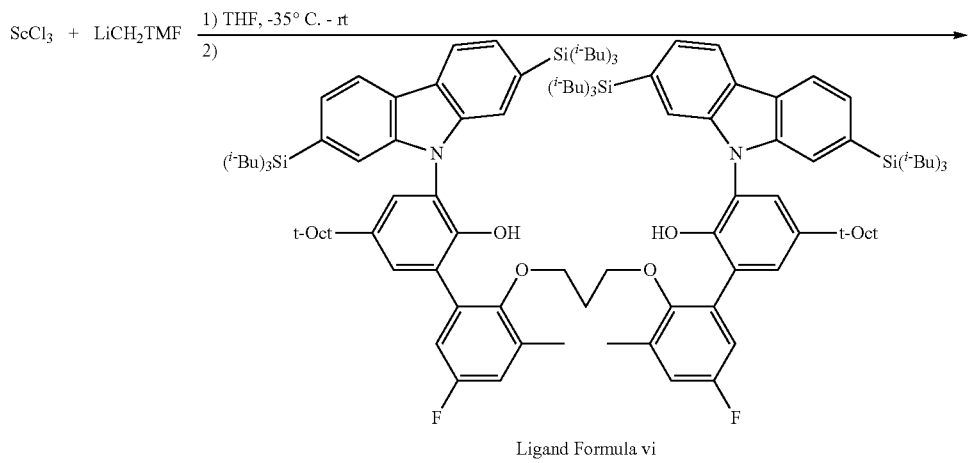

Ligand Formula vi

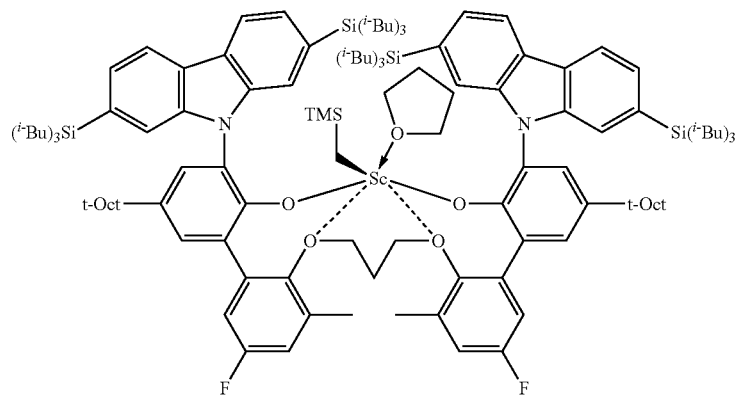

Inventive Metal-Ligand Complex 9 (IMLC-9)

In a $N_2$ filled glovebox, a 20 mL vial was charged with $ScCl_3$ (17.2 mg, 0.11 mmol, 1 equiv.) in 5 mL THF. The solution was vigorously stirred for 4 h at room temperature in order to break the chunks of $ScCl_3$. The solution was cooled to −35° C. for 30 mins. Recrystallized solid $LiCH_2TMS$ (33 mg, 0.35 mmol, 3.1 equiv.) in 5 mL THF was added to the solution and the reaction mixture was stirred at room temperature for 3 h. The solution was cooled at −35° C. for 30 mins. A 5 mL THF solution of Ligand Formula vi (182 mg, 0.11 mmol, 1 equiv.) was added to the above solution and the final reaction mixture was stirred at room temperature for overnight. THF was evaporated under vacuum and the residue was triturated with cold toluene. The residue was dried under vacuum to obtain white solid (86 mg, 42%).

$^1$H NMR (400 MHz, Benzene-$d_6$) δ 8.41-6.94 (m, 20H), 4.17 (d, J=9.4 Hz, 2H), 4.05-3.17 (m, 6H), 2.31-0.43 (m, 142H), −0.24 (s, 9H), −0.82 (d, J=12.5 Hz, 1H), −1.34 (d, J=12.5 Hz, 1H).

Preparation of Ligand Formula vi detailed in WO2017004462 A1.

Example 17—Polymerization Results

The efficiencies and octene incorporation in mole percent (mol %) and/or the melting point of the polymer of the inventive Metal-ligand Complexes 1, 2, 3 and 4, and Comparative C1 and C2, and the polymer characteristics of the polymers yielded from the inventive Catalyst 1 and 2 and Comparative C1 were determined.

The polymerizations were carried out in a semi-batch polymerization reactor. Inventive metal-ligand complex 1 and a chain-transfer agent (CTA), which was selected from diethylzinc (DEZ), diisobutylzinc, (DiBZ), or triethylaluminum (TEA), were used to copolymerize ethylene and 1-octene in a 1-gallon semi-batch polymerization reactor. Catalyst solutions were handled in a glove box under a nitrogen atmosphere prior to addition to the polymerization reactors. The inventive metal-ligand complex 1 was combined with CSA and co-catalyst (20 equiv MMAO in this case) prior to addition to the polymerization. The results of the polymerization reactions are shown in Table 1 and Table 2. Conditions for the semi-batch reactor were: 100 grams of 1-octene, 160 psi of ethylene, and 0 mmol hydrogen were reacted in the presence of 1110 g of Isopar™ E at a reactor temperature of 150° C. and a run time of 10 minutes.

TABLE 1

Ethylene/1-Octene Copolymerization Reactions of Inventive Metal-Ligand Complex 1.

| Catalyst | Temp. (° C.) | Loading (μmol) | Chain Transfer Agent (CTA) | CTA (μmol) | Yield (g) | Efficiency (kg polymer/ g Metal) |
|---|---|---|---|---|---|---|
| Inventive Metal-Ligand Complex 1 (IMLC-1) | 150 | 0.8 | None | 0 | 16.8 | 467 |
| | 150 | 0.8 | DEZ | 100 | 15.8 | 439 |
| | 150 | 0.8 | DEZ | 200 | 9.2 | 256 |
| | 150 | 0.8 | DEZ | 300 | 9.1 | 253 |
| | 150 | 1.3 | DiBZ | 300 | 8.8 | 151 |
| | 150 | 1.3 | None | 0 | 14.6 | 250 |
| | 150 | 1.3 | TEA | 100 | 25.4 | 435 |
| | 150 | 1.3 | TEA | 200 | 18.6 | 318 |
| | 150 | 1.3 | TEA | 200 | 17.9 | 306 |

TABLE 2

Polymer data for Ethylene/1-Octene Copolymerization Reactions of Inventive Metal-Ligand Complex 1 described in Table 1.

| Catalyst | CTA | Amt of CTA (μmol) | Mn (kg/mol) | Mw (kg/mol) | Mw/M | wt % octene | Tm (° C.) |
|---|---|---|---|---|---|---|---|
| Inventive Metal-Ligand Complex 1 (IMLC-1) | None | 0 | 67 | 122 | 1.81 | ND | 123 |
| | DEZ | 100 | 40 | 62 | 1.56 | ND | 130 |
| | DEZ | 200 | 20 | 29 | 1.42 | 0.03 | 131 |
| | DEZ | 300 | 14 | 20 | 1.37 | 0.25 | 131 |
| | DiBZ | 300 | 17 | 27 | 1.57 | 0.31 | 131 |
| | None | 0 | 64 | 116 | 1.81 | ND | 130 |
| | TEA | 100 | 39 | 70 | 1.81 | ND | 130 |
| | TEA | 200 | 23 | 41 | 1.79 | 0.18 | 131 |
| | TEA | 300 | 17 | 30 | 1.79 | 0.03 | 131 |

ND = below detection limit of the instrument

The polymerizations were carried out in a semi-batch polymerization reactor according to the procedure previously described above. Inventive metal-ligand complex 2 and a chain-transfer agent (CTA), which was selected from diethylzinc (DEZ), diisobutylzinc, (DiBZ), or triethylaluminum (TEA), were used to copolymerize ethylene and 1-octene in a 1-gallon semi-batch polymerization reactor. Catalyst solutions were handled in a glove box under a nitrogen atmosphere prior to addition to the polymerization reactors. The inventive metal-ligand complex 1 (IMLC-1) was combined with CTA and co-catalyst (50 equiv MMAO in this case) prior to addition to the polymerization. The results of the polymerization reactions are shown in Table 3 and Table 4. Conditions for the semi-batch reactor were: 100 grams of 1-octene, 160 psi of ethylene, and 0 mmol hydrogen were reacted in the presence of 1110 g of Isopar™ E at a reactor temperature of 150° C. and a run time of 10 minutes.

TABLE 3

Ethylene/1-Octene Copolymerization Reactions of Inventive Metal-Ligand Complex 2.

| Catalyst | Temp. (° C.) | Loading (μmol) | Chain Transfer Agent (CTA) | CSA (μmol) | Yield (g) | Efficiency (kg poly./ g Metal) |
|---|---|---|---|---|---|---|
| Inventive Metal-Ligand Complex 2 (IMLC-1) | 150 | 0.6 | None | 0 | 13.1 | 486 |
| | 150 | 0.6 | DEZ | 100 | 10.7 | 397 |
| | 150 | 0.6 | DEZ | 200 | 10.7 | 397 |
| | 150 | 0.6 | DEZ | 300 | 9.7 | 360 |
| | 150 | 1.2 | DiBZ | 300 | 13.7 | 254 |
| | 150 | 0.6 | None | 0 | 10.9 | 404 |
| | 150 | 0.6 | TEA | 100 | 9.7 | 360 |
| | 150 | 0.6 | TEA | 200 | 6.3 | 234 |
| | 150 | 0.9 | TEA | 200 | 10.8 | 267 |

TABLE 4

Polymer data for Ethylene/1-Octene Copolymerization Reactions of Inventive Metal-Ligand Complex 2 described in Table 3

| Catalyst | CTA | Amt of CSA (μmol) | Mn (kg/mol) | Mw (kg/mol) | Mw/M | wt % octene | Tm (° C.) |
|---|---|---|---|---|---|---|---|
| Inventive Metal-Ligand Complex 2 (IMLC-2) | None | 0 | 34 | 73 | 2.16 | 3.47 | 120 |
| | DEZ | 100 | 25 | 44 | 1.74 | 2.93 | 122 |
| | DEZ | 200 | 21 | 33 | 1.56 | 2.81 | 122 |
| | DEZ | 300 | 14 | 20 | 1.47 | 3.58 | 123 |
| | DiBZ | 300 | 17 | 27 | 1.55 | 3.40 | 123 |
| | None | 0 | 38 | 70 | 1.88 | 2.97 | 120 |

TABLE 4-continued

Polymer data for Ethylene/1-Octene Copolymerization Reactions of Inventive Metal-Ligand Complex 2 described in Table 3

| Catalyst | CTA | Amt of CSA (μmol) | Mn (kg/mol) | Mw (kg/mol) | Mw/M | wt % octene | Tm (° C.) |
|---|---|---|---|---|---|---|---|
| | TEA | 100 | 17 | 35 | 2.03 | 2.33 | 122 |
| | TEA | 200 | 9 | 18 | 2.08 | 3.58 | 124 |
| | TEA | 300 | 11 | 16 | 1.55 | 3.81 | 124 |

The polymerizations were carried out in a semi-batch polymerization reactor according to the procedure previously described above. Inventive metal-ligand complex 3 and a chain-transfer agent (CTA), which was selected from diethylzinc (DEZ), diisobutylzinc, (DiBZ), or triethylaluminum (TEA), were used to copolymerize ethylene and 1-octene in a 1-gallon semi-batch polymerization reactor. Catalyst solutions were handled in a glove box under a nitrogen atmosphere prior to addition to the polymerization reactors. The inventive metal-ligand complex 1 was combined with CTA and co-catalyst (50 equiv MMAO in this case) prior to addition to the polymerization. The results of the polymerization reactions are shown in No borate co-catalyst was employed with the inventive catalysts 3 (IMLC-3). The results of the polymerization reactions are shown in Table 5 and Table 6. Conditions for the semi-batch reactor were: 100 grams of 1-octene, 160 psi of ethylene, and 0 mmol $H_2$ were reacted in the presence of 1110 g of Isopar™ E at a reactor temperature of 150° C. and a run time of 10 minutes.

TABLE 5

Ethylene/1-Octene Copolymerization Reactions of Inventive Metal-Ligand Complex 3.

| Catalyst | Temp. (° C.) | Loading (μmol) | Chain Transfer Agent (CTA) | CTA (μmol) | Yield (g) | Efficiency (kg polymer/ g Metal) |
|---|---|---|---|---|---|---|
| Inventive | 150 | 2 | None | 0 | 11 | 122 |
| Metal- | 150 | 2 | DEZ | 100 | 12.7 | 141 |
| Ligand | 150 | 2 | DEZ | 200 | 10.7 | 119 |
| Complex 3 | 150 | 2 | DEZ | 300 | 10.6 | 118 |
| (IMLC-3) | 150 | 2 | DiBZ | 300 | 10.8 | 120 |
| | 150 | 2 | None | 0 | 11.5 | 128 |
| | 150 | 2 | TEA | 100 | 8.4 | 93 |
| | 150 | 2 | TEA | 200 | 7.4 | 82 |
| | 150 | 2 | TEA | 200 | 6.6 | 73 |

TABLE 6

Polymer data for Ethylene/1-Octene Copolymerization Reactions of Inventive Metal-Ligand Complex 3 described in Table 5

| Catalyst | CTA | Amt of CTA (μmol) | Mn (kg/mol) | Mw (kg/mol) | Mw/M | wt % octene | Tm (° C.) |
|---|---|---|---|---|---|---|---|
| Inventive | None | 0 | 18 | 31 | 1.75 | 4.26 | 121 |
| Metal- | DEZ | 100 | 15 | 25 | 1.63 | 3.84 | 122 |
| Ligand | DEZ | 200 | 13 | 19 | 1.48 | 3.61 | 122 |
| Complex 3 | DEZ | 300 | 11 | 15 | 1.41 | 3.58 | 123 |
| (IMLC-3) | DiBZ | 300 | 9 | 15 | 1.70 | 4.01 | 122 |
| | None | 0 | 17 | 31 | 1.84 | 4.01 | 121 |
| | TEA | 100 | 12 | 20 | 1.57 | 3.96 | 122 |
| | TEA | 200 | 8 | 12 | 1.57 | 4.39 | 123 |
| | TEA | 300 | 5 | 7 | 1.56 | 4.72 | 123 |

The polymerizations were carried out in a semi-batch polymerization reactor according to the procedure previously described above. Inventive metal-ligand complex 4 and a chain-transfer agent (CTA), which was selected from diethylzinc (DEZ), diisobutylzinc, (DiBZ), or triethylaluminum (TEA), were used to copolymerize ethylene and 1-octene in a 1-gallon semi-batch polymerization reactor. Catalyst solutions were handled in a glove box under a nitrogen atmosphere prior to addition to the polymerization reactors. The inventive metal-ligand complex 1 was combined with CTA and co-catalyst (20 equiv MMAO in this case) prior to addition to the polymerization. The results of the polymerization reactions are shown in No borate co-catalyst was employed with the inventive catalysts 4 (IMLC-4). The results of the polymerization reactions are shown in Table 7 and Table 8. Conditions for the semi-batch reactor were: 100 grams of 1-octene, 160 psi of ethylene, and 0 mmol $H_2$ were reacted in the presence of 1110 g of Isopar™ E at a reactor temperature of 150° C. and a run time of 10 minutes.

TABLE 7

Ethylene/1-Octene Copolymerization Reactions of Inventive Metal-Ligand Complex 4.

| Catalyst | Temp. (° C.) | Loading (μmol) | Chain Transfer Agent (CTA) | CTA (μmol) | Yield (g) | Efficiency (kg polymer/ g Metal) |
|---|---|---|---|---|---|---|
| Inventive | 150 | 1.8 | None | 0 | 27.9 | 174 |
| Metal- | 150 | 1.8 | DEZ | 100 | 29.9 | 187 |
| Ligand | 150 | 1.8 | DEZ | 200 | 32.2 | 201 |
| Complex 4 | 150 | 1.8 | DEZ | 300 | 33.9 | 212 |
| (IMLC-4) | 150 | 1.8 | DiBZ | 300 | 30.9 | 193 |
| | 150 | 1.8 | None | 0 | 32.2 | 201 |
| | 150 | 1.8 | TEA | 100 | 47.9 | 299 |
| | 150 | 1.8 | TEA | 200 | 44.7 | 279 |
| | 150 | 1.8 | TEA | 200 | 39.7 | 248 |

TABLE 8

Polymer data for Ethylene/1-Octene Copolymerization Reactions of Inventive Metal-Ligand Complex 4 described in Table 7.

| Catalyst | CTA | Amt of CTA (μmol) | Mn (kg/mol) | Mw (kg/mol) | Mw/M | wt % octene | Tm (° C.) |
|---|---|---|---|---|---|---|---|
| Inventive | None | 0 | 44 | 77 | 1.77 | ND | 130 |
| Metal- | DEZ | 100 | 38 | 64 | 1.70 | 0.08 | 130 |
| Ligand | DEZ | 200 | 33 | 55 | 1.64 | ND | 130 |
| Complex 4 | DEZ | 300 | 30 | 47 | 1.57 | 0.44 | 130 |
| (IMLC-4) | DiBZ | 300 | 26 | 47 | 1.78 | ND | 130 |
| | None | 0 | 43 | 76 | 1.79 | ND | 130 |
| | TEA | 100 | 37 | 65 | 1.78 | ND | 130 |
| | TEA | 200 | 33 | 55 | 1.67 | 0.70 | 130 |
| | TEA | 300 | 26 | 44 | 1.68 | ND | 130 |

ND = below detection limit of the instrument

The polymerizations were carried out in a semi-batch polymerization reactor according to the procedure previously described above. Inventive metal-ligand complex 5 and a chain-transfer agent (CTA), which was selected from diisobutylzinc, (DiBZ) or triethylaluminum (TEA), were used to copolymerize ethylene and 1-octene in a 1-gallon semi-batch polymerization reactor. Catalyst solutions were handled in a glove box under a nitrogen atmosphere prior to addition to the polymerization reactors. The inventive metal-ligand complex 5 was combined with CTA and co-catalyst (10 equiv MMAO in this case) prior to addition to the polymerization. The results of the polymerization reactions are shown in No borate co-catalyst was employed with the inventive catalysts 5 (IMLC-5). The results of the polymerization reactions are shown in Table 9 and Table 10. Conditions for the semi-batch reactor were: 100 grams of 1-octene, 160 psi of ethylene, and 0 mmol H2 were reacted in the presence of 1110 g of Isopar™ E at a reactor temperature of 150° C. and a run time of 10 minutes.

TABLE 9

Ethylene/1-Octene Copolymerization Reactions of Inventive Metal-Ligand Complex 5.

| Catalyst | Temp. (° C.) | Loading (μmol) | Chain Transfer Agent (CTA) | CTA (μmol) | Yield (g) | Efficiency (kg polymer/ g Metal) |
|---|---|---|---|---|---|---|
| Inventive Metal-Ligand Complex 5 (IMLC-5) | 150 | 0.7 | None | 0 | 17.4 | 553 |
| | 150 | 0.7 | DiBZ | 100 | 15.4 | 489 |
| | 150 | 0.7 | DiBZ | 200 | 5 | 159 |
| | 150 | 0.7 | DiBZ | 300 | 3.8 | 121 |
| | 150 | 0.6 | None | 0 | 15.3 | 567 |
| | 150 | 0.6 | TEA | 100 | 30.8 | 1,147 |
| | 150 | 0.6 | TEA | 200 | 34.9 | 1,297 |
| | 150 | 0.6 | TEA | 200 | 51.3 | 1,902 |

TABLE 10

Polymer data for Ethylene/1-Octene Copolymerization Reactions of Inventive Metal-Ligand Complex 5 described in Table 9.

| Catalyst | CTA | Amt of CTA (μmol) | Mn (kg/ mol) | Mw (kg/ mol) | Mw/M | wt % octene | Tm (° C.) |
|---|---|---|---|---|---|---|---|
| Inventive Metal-Ligand Complex 5 (IMLC-5) | None | 0 | 41 | 82 | 2.02 | ND | 130 |
| | DiBZ | 100 | 38 | 65 | 1.71 | ND | 131 |
| | DiBZ | 200 | 21 | 34 | 1.66 | 0.31 | 131 |
| | DiBZ | 300 | 14 | 24 | 1.68 | 0.46 | 131 |
| | None | 0 | 50 | 94 | 1.88 | 0.13 | 131 |
| | TEA | 100 | 34 | 61 | 1.78 | ND | 131 |
| | TEA | 200 | 27 | 48 | 1.75 | ND | 131 |
| | TEA | 300 | 22 | 37 | 1.70 | ND | 131 |

ND = below detection limit of the instrument

The polymerizations were carried out in a semi-batch polymerization reactor according to the procedure previously described above. Inventive metal-ligand complex 6 and a chain-transfer agent (CTA), which was selected from diisobutylzinc, (DiBZ) or triethylaluminum (TEA), were used to copolymerize ethylene and 1-octene in a 1-gallon semi-batch polymerization reactor. Catalyst solutions were handled in a glove box under a nitrogen atmosphere prior to addition to the polymerization reactors. The inventive metal-ligand complex 6 was combined with CTA and co-catalyst (20 equiv MMAO in this case) prior to addition to the polymerization. The results of the polymerization reactions are shown in No borate co-catalyst was employed with the inventive catalysts 6 (IMLC-6). The results of the polymerization reactions are shown in Table 9 and Table 10. Conditions for the semi-batch reactor were: 200 grams of 1-octene, 200 psi of ethylene, and 0 mmol H2 were reacted in the presence of 1110 g of Isopar™ E at a reactor temperature of 150° C. and a run time of 10 minutes.

TABLE 11

Ethylene/1-Octene Copolymerization Reactions of Inventive Metal-Ligand Complex 6.

| Catalyst | Temp. (° C.) | Loading (μmol) | Chain Transfer Agent (CTA) | CTA (μmol) | Yield g | Efficiency (kg polymer/ g Metal) |
|---|---|---|---|---|---|---|
| Inventive Metal-Ligand Complex 6 (IMLC-6) | 150 | 0.37 | None | 0 | 13.1 | 777 |
| | 150 | 0.48 | DiBZ | 100 | 13.1 | 607 |
| | 150 | 1.4 | DiBZ | 200 | 16.5 | 253 |
| | 150 | 0.43 | DiBZ | 300 | 8.6 | 443 |
| | 150 | 0.35 | None | 0 | 7.1 | 454 |
| | 150 | 0.2 | TEA | 100 | 12.0 | 1,335 |

TABLE 12

Polymer data for Ethylene/1-Octene Copolymerization Reactions of Inventive Metal-Ligand Complex 6 described in Table 11.

| Catalyst | CTA | Amt of CTA (μmol) | Mn (kg/ mol) | Mw (kg/ mol) | Mw/M | wt % octene | Tm (° C.) |
|---|---|---|---|---|---|---|---|
| Inventive Metal-Ligand Complex 6 (IMLC-6) | None | 0 | 43 | 88 | 2.03 | ND | 129 |
| | DiBZ | 100 | 31 | 56 | 1.82 | ND | 129 |
| | DiBZ | 200 | 24 | 39 | 1.66 | ND | 130 |
| | DiBZ | 300 | 16 | 26 | 1.59 | ND | 130 |
| | None | 0 | 44 | 84 | 1.92 | ND | 129 |
| | TEA | 100 | 26 | 51 | 1.94 | ND | 130 |

ND = below detection limit of the instrument

The polymerizations were carried out in a semi-batch polymerization reactor according to the procedure previously described above. Inventive metal-ligand complex 7 and a chain-transfer agent (CTA), which was selected from diisobutylzinc, (DiBZ) or triethylaluminum (TEA), were used to copolymerize ethylene and 1-octene in a 1-gallon semi-batch polymerization reactor. Catalyst solutions were handled in a glove box under a nitrogen atmosphere prior to addition to the polymerization reactors. The inventive metal-ligand complex 6 was combined with CTA and co-catalyst (20 equiv MMAO in this case) prior to addition to the polymerization. The results of the polymerization reactions are shown in No borate co-catalyst was employed with the inventive catalysts 7 (IMLC-7). The results of the polymerization reactions are shown in Table 9 and Table 10. Conditions for the semi-batch reactor were: 200 grams of 1-octene, 200 psi of ethylene, and 0 mmol H2 were reacted in the presence of 1110 g of Isopar™ E at a reactor temperature of 150° C. and a run time of 10 minutes.

TABLE 13

Ethylene/1-Octene Copolymerization Reactions of Inventive Metal-Ligand Complex 7.

| Catalyst | Temp. (° C.) | Loading (μmol) | Chain Transfer Agent (CTA) | CTA (μmol) | Yield (g) | Efficiency (kg polymer/ g Metal) |
|---|---|---|---|---|---|---|
| Inventive Metal-Ligand Complex 7 (IMLC-7) | 150 | 0.43 | None | 0 | 8.7 | 448 |
| | 150 | 0.43 | DiBZ | 100 | 7.8 | 408 |
| | 150 | 0.44 | DiBZ | 200 | 9.6 | 488 |
| | 150 | 0.43 | DiBZ | 300 | 6.4 | 335 |
| | 150 | 0.4 | None | 0 | 10.8 | 601 |
| | 150 | 0.29 | TEA | 100 | 11.1 | 859 |
| | 150 | 0.19 | TEA | 200 | 9.3 | 1,103 |
| | 150 | 0.3 | TEA | 200 | 13.7 | 1,016 |

TABLE 14

Polymer data for Ethylene/1-Octene Copolymerization Reactions of Inventive Metal-Ligand Complex 7 described in Table 13.

| Catalyst | CTA | Amt of CTA (μmol) | Mn (kg/mol) | Mw (kg/mol) | Mw/M | wt % octene | Tm (° C.) |
|---|---|---|---|---|---|---|---|
| Inventive | None | 0 | 47 | 93 | 1.97 | ND | 130 |
| Metal- | DiBZ | 100 | 30 | 53 | 1.78 | ND | 130 |
| Ligand | DiBZ | 200 | 23 | 39 | 1.69 | ND | 131 |
| Complex 7 | DiBZ | 300 | 16 | 25 | 1.62 | ND | 131 |
| (IMLC-7) | None | 0 | 45 | 88 | 1.95 | ND | 131 |
| | TEA | 100 | 47 | 92 | 1.95 | ND | 131 |
| | TEA | 200 | 26 | 52 | 1.95 | ND | 131 |
| | TEA | 300 | 24 | 45 | 1.91 | ND | 131 |

ND = below detection limit of the instrument

The polymerizations were carried out in a semi-batch polymerization reactor. Inventive metal-ligand complex 8 and a chain-transfer agent (CTA), which was selected from diethylzinc (DEZ) or triethylaluminum (TEA), were used to copolymerize ethylene and 1-octene in a 2-L semi-batch polymerization reactor. Catalyst solutions were handled in a glove box under a nitrogen atmosphere prior to addition to the polymerization reactors. The CSA and inventive metal-ligand complex 8 were added to the reactor sequentially. No co-catalyst (MMAO or borate) was used in the polymerization. The results of the polymerization reactions are shown in Table 15 and Table 16. Conditions for the semi-batch reactor were: 28 grams of 1-octene, 28 g of ethylene, and 0 mmol H2 were reacted in the presence of 520 g of Isopar™ E at a reactor temperature of 150° C. and a run time of 10 minutes.

TABLE 15

Ethylene/1-Octene Copolymerization Reactions of Inventive Metal-Ligand Complex 8.

| Catalyst | Temp. (° C.) | Loading (μmol) | Chain Transfer Agent (CTA) | CTA (μmol) | Yield (g) | Efficiency (kg polymer/g Metal) |
|---|---|---|---|---|---|---|
| Inventive | 150 | 0.1 | None | 0 | 3.2 | 712 |
| Metal- | 150 | 0.1 | DEZ | 50 | 0.9 | 200 |
| Ligand | 150 | 0.15 | DEZ | 200 | 3.1 | 460 |
| Complex 8 | 150 | 0.1 | TEA | 50 | 3.8 | 845 |
| (IMLC-8) | 150 | 0.1 | TEA | 200 | 4.0 | 890 |

TABLE 16

Polymer data for Ethylene/1-Octene Copolymerization Reactions of Inventive Metal-Ligand Complex 8 described in Table 9.

| Catalyst | CTA | Amt of CTA (μmol) | Mn (kg/mol) | Mw (kg/mol) | Mw/M | wt % octene | Tm (° C.) |
|---|---|---|---|---|---|---|---|
| Inventive | None | 0 | 174 | 502 | 2.88 | ND | 136 |
| Metal- | DEZ | 50 | 24 | 98 | 4.01 | ND | 138 |
| Ligand | DEZ | 200 | 10 | 24 | 2.42 | 0.33 | 132 |
| Complex 8 | TEA | 50 | 63 | 172 | 2.75 | ND | 136 |
| (IMLC-8) | TEA | 200 | 16 | 54 | 3.41 | ND | 133 |

ND = below detection limit of the instrument

The polymerizations were carried out in a semi-batch polymerization reactor. Inventive metal-ligand complex 9 and a chain-transfer agent (CTA), which was selected from diethylzinc (DEZ) or triethylaluminum (TEA), were used to copolymerize ethylene and 1-octene in a 2-L semi-batch polymerization reactor. Catalyst solutions were handled in a glove box under a nitrogen atmosphere prior to addition to the polymerization reactors. The CSA and inventive metal-ligand complex 9 were added to the reactor sequentially. No co-catalyst (MMAO or borate) was used in the polymerization. The results of the polymerization reactions are shown in Table 17 and Table 18. Conditions for the semi-batch reactor were: 28 grams of 1-octene, 28 g of ethylene, and 0 mmol H2 were reacted in the presence of 520 g of Isopar™ E at a reactor temperature of 150° C. and a run time of 10 minutes.

TABLE 17

Ethylene/1-Octene Copolymerization Reactions of Inventive Metal-Ligand Complex 9.

| Catalyst | Temp. (° C.) | Loading (μmol) | Chain Transfer Agent (CTA) | CTA (μmol) | Yield (g) | Efficiency (kg polymer/g Metal) |
|---|---|---|---|---|---|---|
| Inventive | 150 | 0.05 | None | 0 | 0.9 | 400 |
| Metal- | 150 | 0.05 | DEZ | 50 | 1.2 | 534 |
| Ligand | 150 | 0.15 | DEZ | 200 | 4.9 | 727 |
| Complex 9 | 150 | 0.05 | TEA | 50 | 2.6 | 1157 |
| (IMLC-9) | 150 | 0.05 | TEA | 200 | 4.0 | 1780 |

TABLE 18

Polymer data for Ethylene/1-Octene Copolymerization Reactions of Inventive Metal-Ligand Complex 9 described in Table 11.

| Catalyst | CTA | Amt of CTA (μmol) | Mn (kg/mol) | Mw (kg/mol) | Mw/M | wt % octene | Tm (° C.) |
|---|---|---|---|---|---|---|---|
| Inventive | None | 0 | 220 | 706 | 3.21 | ND | 137 |
| Metal- | DEZ | 50 | 28 | 107 | 3.84 | ND | 133 |
| Ligand | DEZ | 200 | 17 | 62 | 3.66 | ND | 133 |
| Complex 9 | TEA | 50 | 140 | 368 | 2.63 | ND | 138 |
| (IMLC-9) | TEA | 200 | 53 | 142 | 2.67 | ND | 136 |

ND = below detection limit of the instrument

The Comparative Metal-ligand Complexes $C_1$ and $C_2$ (herein "Comparative $C_1$" and "Comparative C2") were each intermixed with Co-catalyst 1 to form a catalyst system. The Procatalysts 1, 2, and 3 have a structure according to the metal-ligand complex of formula (I). The Comparative Metal-ligand Complexes had the following structures:

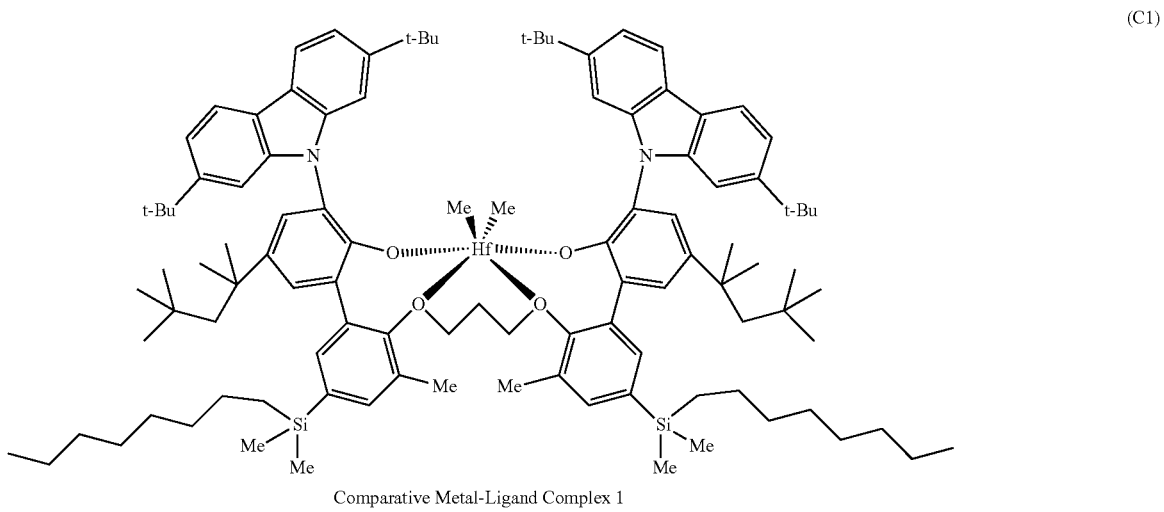

Comparative Metal-Ligand Complex 1

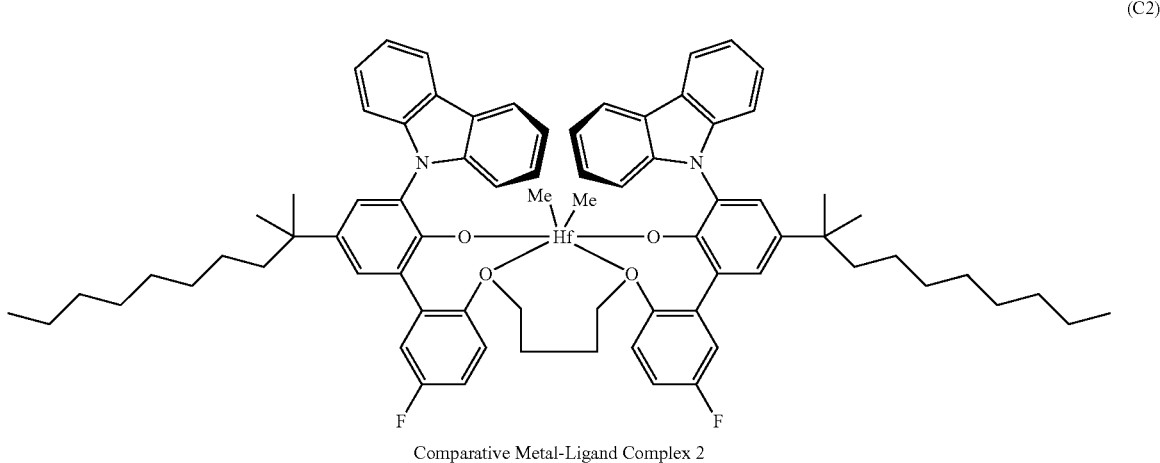

Comparative Metal-Ligand Complex 2

For synthesis of C1 refer to WO2017058981 A1. For the synthesis of C2 refer to WO2018170138A1.

The polymerizations were carried out in a semi-batch polymerization reactor according to the procedure previously described above. Comparative metal-ligand complexes 1 or 2 and a chain-transfer agent (CTA), which was selected from diethylzinc (DEZ), diisobutylzinc, (DiBZ), or triethylaluminum (TEA), were used to copolymerize ethylene and 1-octene in a 1-gallon semi-batch polymerization reactor. Catalyst solutions were handled in a glove box under a nitrogen atmosphere prior to addition to the polymerization reactors. The inventive metal-ligand complex 1 was combined with CTA and co-catalyst (1.2 equiv of bis(octadecyl)methylammonium tetrakis(pentafluorophenyl)borate) and scavenger (20 equiv MMAO in this case) prior to addition to the polymerization. The results of the polymerization reactions are shown in Table 9, Table 10, Table 11, and Table 12. Conditions for the semi-batch reactor were: 100 grams of 1-octene, 160 psi of ethylene, and 0 mmol $H_2$ were reacted in the presence of 1110 g of Isopar™ E at a reactor temperature of 150° C. and a run time of 10 minutes.

TABLE 9

Polymer data for Ethylene/1-Octene Copolymerization Reactions of Comparative Metal-Ligand Complex 1 (C1).

| Catalyst | CTA | Amt of CTA (μmol) | Mn (kg/mol) | Mw (kg/mol) | Mw/M | wt % octene | Tm (° C.) |
|---|---|---|---|---|---|---|---|
| Comparative Metal-Ligand Complex 1 (C1) | None | 0 | 255 | 577 | 2.26 | 0.9 | 122 |
| | DEZ | 100 | 97 | 250 | 2.56 | 0.77 | 124 |
| | DEZ | 200 | 72 | 171 | 2.37 | 0.83 | 125 |
| | DEZ | 300 | 60 | 147 | 2.46 | 0.77 | 126 |
| | DiBZ | 300 | 186 | 413 | 2.22 | 0.63 | 123 |
| | None | 0 | 223 | 512 | 2.30 | 1.6 | 121 |
| | TEA | 1000 | 185 | 418 | 2.26 | 0.9 | 122 |
| | TEA | 2000 | 143 | 317 | 2.22 | 0.8 | 123 |
| | TEA | 3000 | 114 | 253 | 2.23 | 1.3 | 124 |

TABLE 10

Ethylene/1-Octene Copolymerization Reactions
of Comparative Metal-Ligand Complex 1 (C1).

| Catalyst | Temp. (° C.) | Loading (μmol) | Chain Transfer Agent (CTA) | CTA (μmol) | Yield (g) | Efficiency (kg polymer/ g Metal) |
|---|---|---|---|---|---|---|
| Comparative | 150 | 0.2 | None | 0 | 18 | 504 |
| Metal- | 150 | 0.1 | DEZ | 100 | 22.4 | 1255 |
| Ligand | 150 | 0.1 | DEZ | 200 | 20.4 | 1143 |
| Complex 1 | 150 | 0.1 | DEZ | 300 | 21.9 | 1227 |
| (C1) | 150 | 0.1 | DiBZ | 300 | 20.2 | 1132 |
|  | 150 | 0.2 | None | 0 | 17 | 476 |
|  | 150 | 0.2 | TEA | 1000 | 14.3 | 401 |
|  | 150 | 0.2 | TEA | 2000 | 18.5 | 518 |
|  | 150 | 0.3 | TEA | 3000 | 13.2 | 247 |

TABLE 11

Polymer data for Ethylene/1-Octene Copolymerization
Reactions of Comparative Metal-Ligand Complex 2 (C2).

| Catalyst | CTA | Amt of CTA (μmol) | Mn (kg/ mol) | Mw (kg/ mol) | Mw/M | wt % octene | Tm (° C.) |
|---|---|---|---|---|---|---|---|
| Comparative | None | 0 | 436 | 970 | 2.22 | 31.16 | 57 |
| Metal- | DEZ | 100 | 158 | 357 | 2.26 | 31.08 | 59 |
| Ligand | DEZ | 200 | 97 | 218 | 2.24 | 30.7 | 61 |
| Complex 2 | DEZ | 300 | 66 | 144 | 2.18 | 30.64 | 62 |
| (C2) | DiBZ | 300 | 248 | 525 | 2.12 | 30.67 | 59 |

TABLE 12

Ethylene/1-Octene Copolymerization Reactions
of Comparative Metal-Ligand Complex 2 (C2).

| Catalyst | Temp. (° C.) | Loading (μmol) | Chain Transfer Agent (CTA) | CTA (μmol) | Yield (g) | Efficiency (kg polymer/ g Metal) |
|---|---|---|---|---|---|---|
| Comparative | 150 | 0.2 | None | 0 | 30.7 | 860 |
| Metal- | 150 | 0.2 | DEZ | 100 | 24.1 | 675 |
| Ligand | 150 | 0.2 | DEZ | 200 | 26.2 | 734 |
| Complex 2 | 150 | 0.2 | DEZ | 300 | 24.2 | 678 |
| (C2) | 150 | 0.2 | DiBZ | 300 | 23.2 | 650 |

Equipment Standards

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

The invention claimed is:

1. A polymerization process comprising contacting ethylene and optionally one or more α-olefins in solution in the presence of one or more catalyst systems and a chain transfer agent, wherein the one or more catalyst systems comprise a metal-ligand complex according to formula (I):

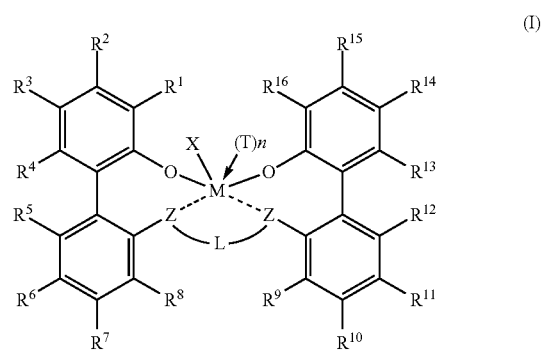

where:

M is scandium, yttrium, or a lanthanide metal having an oxidation state of +3;

X is a ligand chosen from ($C_1$-$C_{40}$)hydrocarbyl, ($C_1$-$C_{40}$) heterohydrocarbyl, —$CH_2Si(R^C)_{3-Q}(OR)_Q$, —$Si(R^C)_{3-Q}(OR^C)Q$, —$OSi(R^C)_{3-Q}(OR^C)Q$, —$CH_2Ge(R^C)_{3-Q}(OR)_Q$, —$Ge(R^C)_{3-Q}(OR^C)_Q$, —$P(R^C)_{2-W}(OR)_W$, —$P(O)(R^C)_{2-W}(OR^C)_W$, —$N(R^C)_2$, —$NH(R^C)$, —$N(Si(R^C)_3)_2$, —$NR^CSi(R^C)_3$, —$NHSi(R^C)_3$, —$OR^C$, —$SR^C$, —$NO_2$, CN, —$CF_3$, —$OCF_3$, —$S(O)R^C$, —$S(O)_2R^C$, —$OS(O)_2R^C$, —$N{=}C(R^C)_2$, —$N{=}CH(R^C)$, —$N{=}CH_2$, —$N{=}P(R^C)_3$, —$OC(O)R^C$, —$C(O)OR^C$, —$N(R^C)C(O)R^C$, —$N(R^C)C(O)H$, —$NHC(O)R^C$, —$C(O)N(R^C)_2$, —$C(O)NHR^C$, —$C(O)NH_2$, a halogen, or a hydrogen, wherein each $R^C$ is independently a substituted or unsubstituted ($C_1$-$C_{30}$) hydrocarbyl, or a substituted or unsubstituted ($C_1$-$C_{30}$) heterohydrocarbyl, and each Q is 0, 1, 2 or 3 and each W is 0, 1, or 2; $B(R^Y)_4$, $Al(R^Y)_4$, or $Ga(R^Y)_4$, wherein each $R^Y$ is —H, ($C_1$-$C_{30}$)hydrocarbyl, or halogen atom;

each M-Z bond is a dative bond;

each T is a Lewis Base;

n is 0, 1, or 2, when n is 1, X and T are optionally linked, when n is 2, X and one of T are optionally linked;

the metal-ligand complex is overall charge-neutral;

each Z is independently chosen from —O—, —S—, —$N(R^N)$—, or —$P(R^P)$—, wherein the dotted line optionally defines a dative bond;

$R^1$ and $R^{16}$ are independently selected from the group consisting of ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, —$N{=}C(R^C)_2$, $R^CC(O)O$—, $R^COC(O)$—, $R^CC(O)N(R)$—, $(R^C)_2NC(O)$—, or halogen;

$R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently selected from —H, ($C_1$-$C_{40}$) hydrocarbyl, ($C_1$-$C_{40}$)heterohydrocarbyl, —$Si(R^C)_3$, —$Ge(R^C)_3$, —$P(R^P)_2$, —$N(R^N)_2$—$OR^C$, —$SR^C$, —$NO_2$, —CN, —$CF_3$, $R^CS(O)$—, $R^CS(O)_2$—, $(R^C)_2C{=}N$—, $(R^C)_2P{=}N$—, $R^CC(O)O$—, $R^COC(O)$—, $R^CC(O)N(R)$—, $(R^C)_2NC(O)$—, and halogen;

provided that when M is yttrium or a lanthanide metal, $R^1$ is not phenyl or tert-butyl; and $R^{16}$ is not phenyl or tert-butyl;

L is ($C_1$-$C_{40}$)hydrocarbylene or ($C_1$-$C_{40}$)heterohydrocarbylene; and each $R^C$, $R^P$, and $R^N$ in formula (I) is independently a $(C_1\text{-}C_{30})$hydrocarbyl, $(C_1\text{-}C_{30})$heterohydrocarbyl, or —H.

2. The polymerization process of claim 1, wherein the chain transfer agent is chosen from $((C_1\text{-}C_{40})$hydrocarbyl$)_2$Zn, $((C_1\text{-}C_{40})$hydrocarbyl$)_3$Al, alkylaluminum halide, or modified alkyl aluminoxane.

3. The polymerization process of claim 1, wherein a co-catalyst is absent from the one or more catalyst systems.

4. The polymerization process of claim 1, wherein the chain transfer agent is modified methylaluminoxane.

5. The polymerization process of claim 1, wherein the chain transfer agent is an allylaluminum, a dialkyl zinc or a combination thereof.

6. The polymerization process according to claim 1, where $R^1$ and $R^{16}$ are chosen from radicals having formula (II), radicals having formula (III), or radicals having formula (IV):

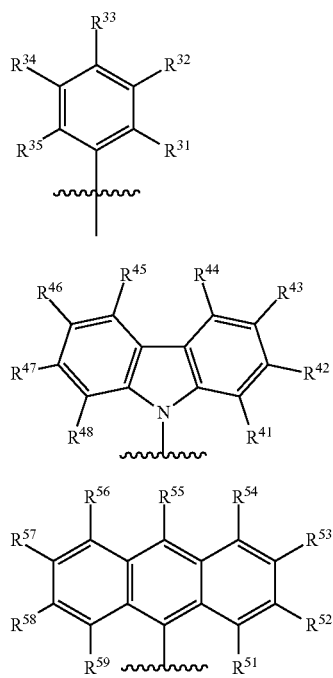

where each of $R^{31\text{-}35}$, $R^{41\text{-}48}$, and $R^{51\text{-}59}$ is independently chosen from —H, $(C_1\text{-}C_{40})$hydrocarbyl, $(C_1\text{-}C_{40})$heterohydrocarbyl, —Si$(R^C)_3$, —Ge$(R^C)_3$, —P$(R^P)_2$, —N$(R^N)_2$, —O$R^C$, —S$R^C$, —NO$_2$, —CN, —CF$_3$, $R^CS(O)$—, $R^CS(O)_2$—, $(R^C)_2C$=N—, $R^CC(O)O$—, $R^COC(O)$—, $R^CC(O)N(R^N)$—, $(R^C)_2NC(O)$—, or halogen.

7. The polymerization process according to claim 6, wherein at least one of $R^1$ and $R^{16}$ is a radical having formula (III).

8. The polymerization process according to claim 7, wherein $R^{42}$ and $R^{47}$ are $(C_1\text{-}C_{20})$hydrocarbyl, —Si[$(C_1\text{-}C_{20})$hydrocarbyl]$_3$, or —Ge[$(C_1\text{-}C_{20})$hydrocarbyl]$_3$; or $R^{43}$ and $R^{46}$ are $(C_1\text{-}C_{20})$hydrocarbyl, —Si[$(C_1\text{-}C_{20})$hydrocarbyl]$_3$, or —Ge[$(C_1\text{-}C_{20})$hydrocarbyl]$_3$.

9. The polymerization process according to claim 7, wherein optionally $R^{42}$ and $R^{43}$ are linked to form a cyclic structure, and optionally $R^{46}$ and $R^{47}$ are linked to form a cyclic structure.

10. The polymerization process according to claim 6, wherein at least one of $R^1$ and $R^{16}$ is a radical having formula (II) and $R^{32}$ and $R^{34}$ are $(C_1\text{-}C_{20})$hydrocarbyl, —Si[$(C_1\text{-}C_{20})$hydrocarbyl]$_3$, or —Ge[$(C_1\text{-}C_{20})$hydrocarbyl]$_3$.

11. The polymerization process according to claim 6, wherein at least one of $R^1$ and $R^{16}$ is a radical having formula (IV) and at least two of $R^{52}$, $R^{53}$, $R^{55}$, $R^{57}$, and $R^{58}$ are $(C_1\text{-}C_{20})$hydrocarbyl, —Si[$(C_1\text{-}C_{20})$hydrocarbyl]$_3$, or —Ge[$(C_1\text{-}C_{20})$hydrocarbyl]$_3$.

12. The polymerization process according to claim 1, wherein $R^8$ and $R^9$ are methyl.

13. The polymerization process according to claim 1, wherein $R^6$ and $R^{11}$ are not —H.

14. The polymerization process according to claim 1, where L is chosen from —CH$_2$—, —CH$_2$(CH$_2$)$_m$CH$_2$— where m is from 0 to 3, —CH$_2$Si$(R^C)_2$CH$_2$—, —CH$_2$Ge$(R^C)_2$CH$_2$—, —CH(CH$_3$)CH$_2$CH(CH$_3$), and —CH$_2$(phen-1,2-di-yl)CH$_2$—, where each $R^C$ in L is $(C_1\text{-}C_{20})$hydrocarbyl.

15. The polymerization process according to claim 1, wherein X is —CH$_2$Si[$(C_1\text{-}C_{20})$alkyl]$_3$.

16. The polymerization process according to claim 1, wherein n is 1 or 2; and at least one T is $(C_1\text{-}C_{20})$heterohydrocarbon, wherein a hetero atom of the heterohydrocarbon is oxygen.

17. The polymerization process according to claim 1, wherein n is 1 or 2; and at least one T is tetrahydrofuran, diethyl ether, or methyl tert-butyl ether (MTBE).

18. The polymerization process according to claim 1, wherein when M is yttrium or a lanthanide metal, at least one of $R^{5\text{-}8}$ is not —H and at least one of $R^{9\text{-}12}$ is not —H.

19. The polymerization process according to claim 1, wherein the one or more catalyst systems further comprise an additive.

* * * * *